(12) United States Patent
Yung et al.

(10) Patent No.: US 7,110,954 B2
(45) Date of Patent: Sep. 19, 2006

(54) WIRELESS PURCHASE AND ON-LINE INVENTORY APPARATUS AND METHOD FOR VENDING MACHINES

(75) Inventors: Hon Ching Yung, Hong Kong (HK); Kwong Keung Leung, Tuen Mun (HK); Hon Seng Lai, Hong Kong (HK)

(73) Assignee: University of Hong Kong, Hong Kong (CN)

( * ) Notice: Subject to any disclaimer, the term of this patent is extended or adjusted under 35 U.S.C. 154(b) by 770 days.

(21) Appl. No.: 09/803,818

(22) Filed: Mar. 12, 2001

(65) Prior Publication Data

US 2002/0128932 A1 Sep. 12, 2002

(51) Int. Cl.
G06Q 10/00 (2006.01)

(52) U.S. Cl. .................... 705/1; 235/381; 455/420

(58) Field of Classification Search ............ 705/1, 705/16, 26, 28, 22; 455/420, 426.1, 406; 235/380, 381
See application file for complete search history.

(56) References Cited

U.S. PATENT DOCUMENTS

| | | | |
|---|---|---|---|
| 4,412,292 A | 10/1983 | Sedam et al. .......... | 364/479 |
| 5,495,929 A * | 3/1996 | Batalianets et al. ..... | 194/207 |
| 5,794,144 A | 8/1998 | Comer et al. .......... | 455/426 |
| 5,930,771 A | 7/1999 | Stapp .................. | 705/28 |
| 5,963,452 A | 10/1999 | Etoh et al. ........... | 364/479.06 |
| 6,056,194 A | 5/2000 | Kolls ................. | 235/381 |
| 6,457,038 B1 * | 9/2002 | Defosse .............. | 709/200 |
| 6,478,187 B1 * | 11/2002 | Simson et al. ......... | 221/75 |
| 6,764,003 B1 * | 7/2004 | Martschitsch et al. ... | 235/383 |

FOREIGN PATENT DOCUMENTS

WO    WO 01/54087    *    7/2001

OTHER PUBLICATIONS

No author; New Bellsouth Technology Offers Economical Way to Read Meters, Track Vending Inventory Wirelessly; Bellsouth Test under way in Indianapolis; Jul. 25, 1995; PR Newswire P725AT005; dialog copy 2 pages.*

No author; Mobile Devices and the Internet to be the Star Attractions at CeBIT 2000, CellPoint and Unwire Exhibit to 700,000 expected visitors; Feb. 24, 2000; Business Wire, p. 1392; dialog copy 2 pages.*

* cited by examiner

*Primary Examiner*—Thomas A. Dixon
(74) *Attorney, Agent, or Firm*—Robert D. Ratz, Esq.; Cooper & Dunham LLC

(57) ABSTRACT

The present invention relates to an apparatus and a method for wireless purchase of merchandise from a vending machine by using a cellular mobile phone. The present invention permits a cellular mobile phone user to dial a sequence of code on the phone to invoke the vending machine to dispense merchandise, where payment is charged to the mobile phone account. The present invention also relates to an apparatus and a method for on-line inventory management. With on-line inventory management, the present invention provides high efficient operation, reduced operation cost, and just-in-time service and merchandise delivery. The present invention further relates to an apparatus and a method that allow both on-line inventory management and wireless purchase of merchandise in a vending machine.

11 Claims, 16 Drawing Sheets

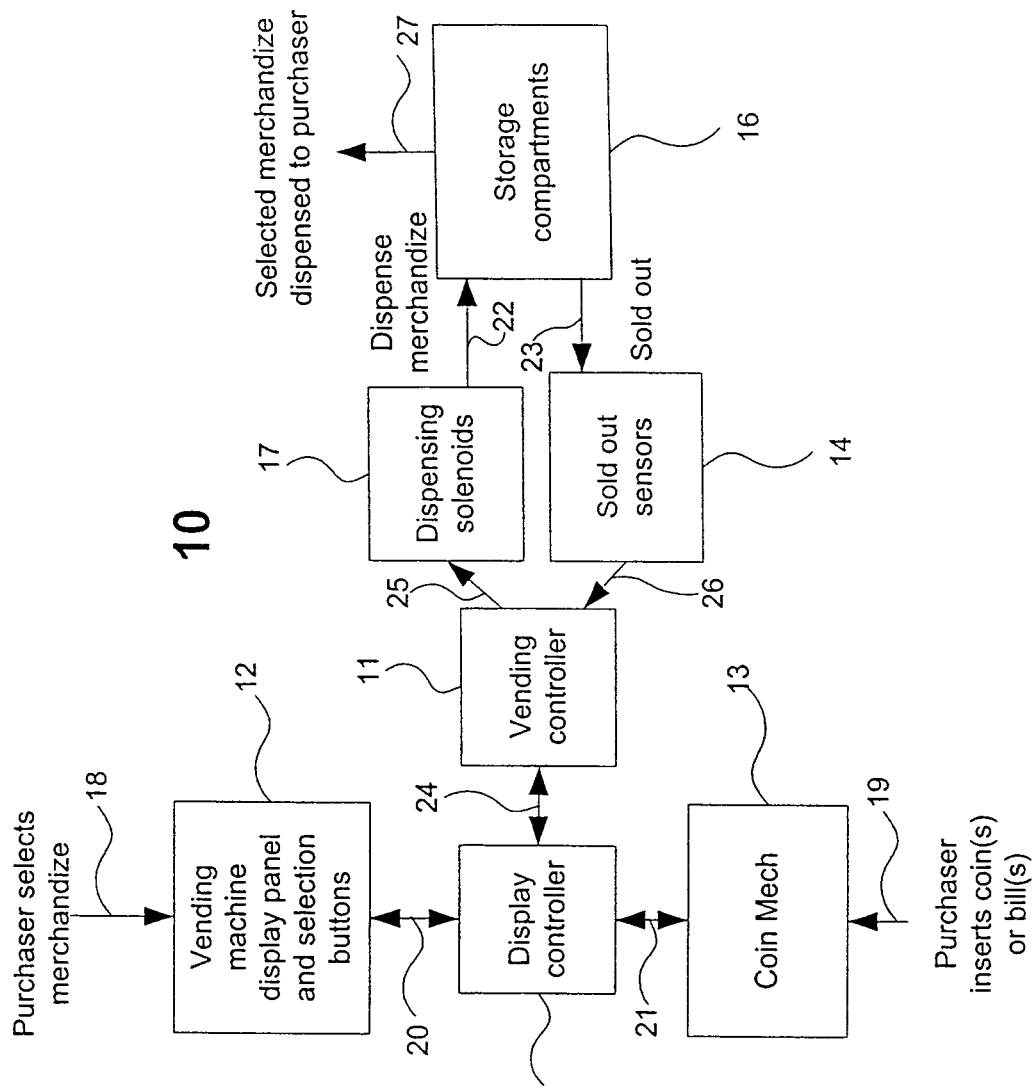
Fig. 1: Block diagram of a vending machine of the mechanical type

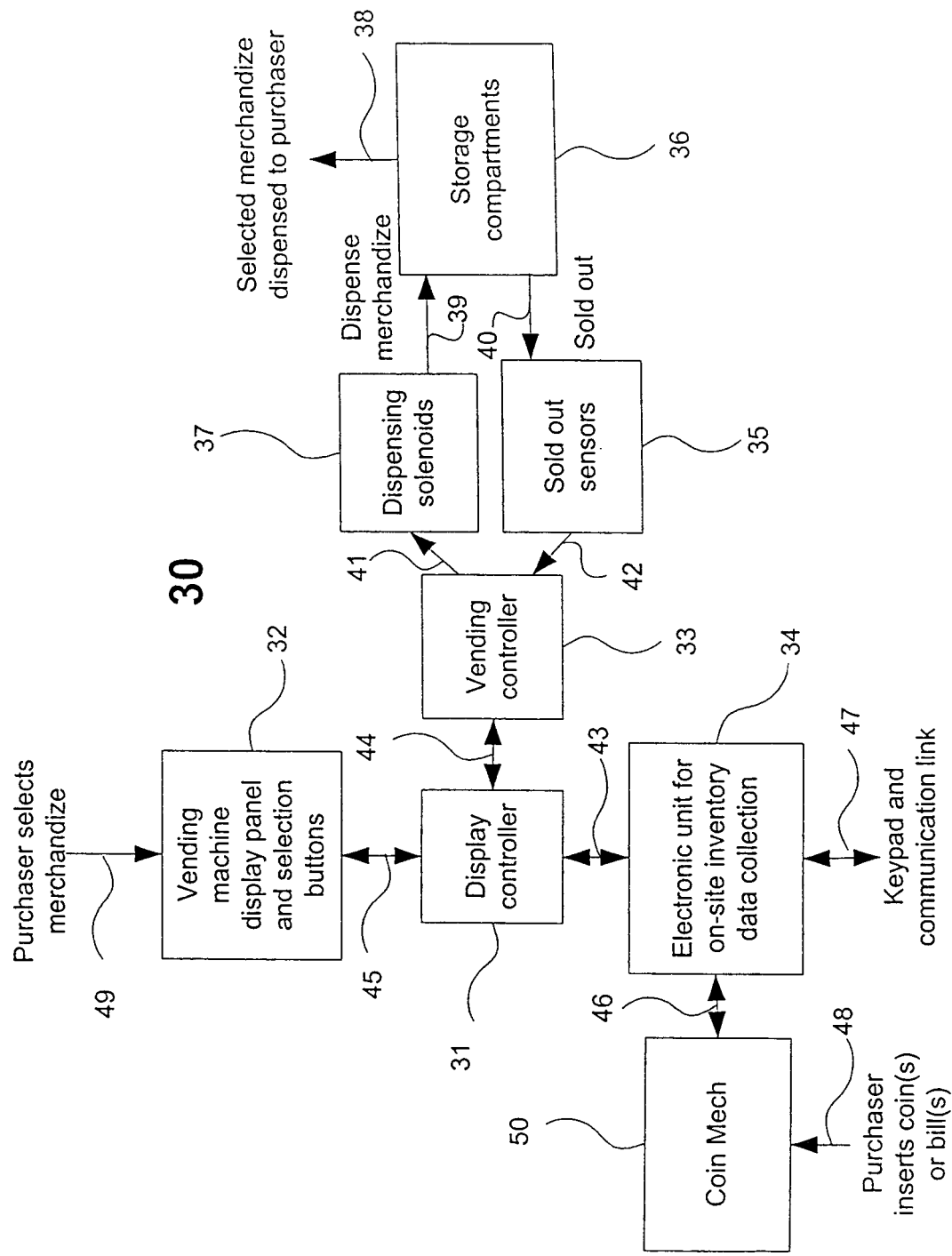
Fig. 2: Block diagram of a vending machine of the electronic type

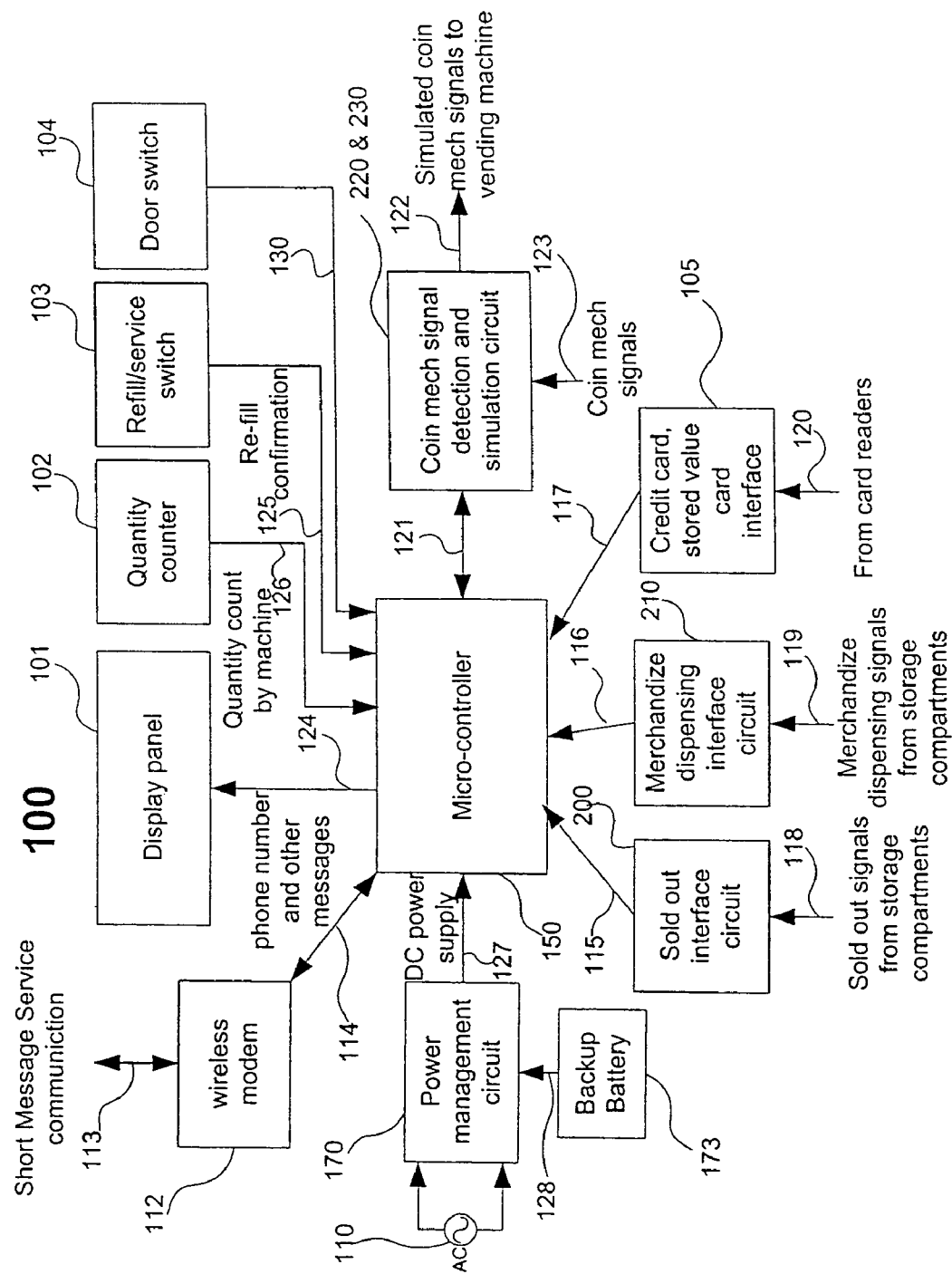
Fig. 3: Block diagram of the Control and Communication Unit (CCU)

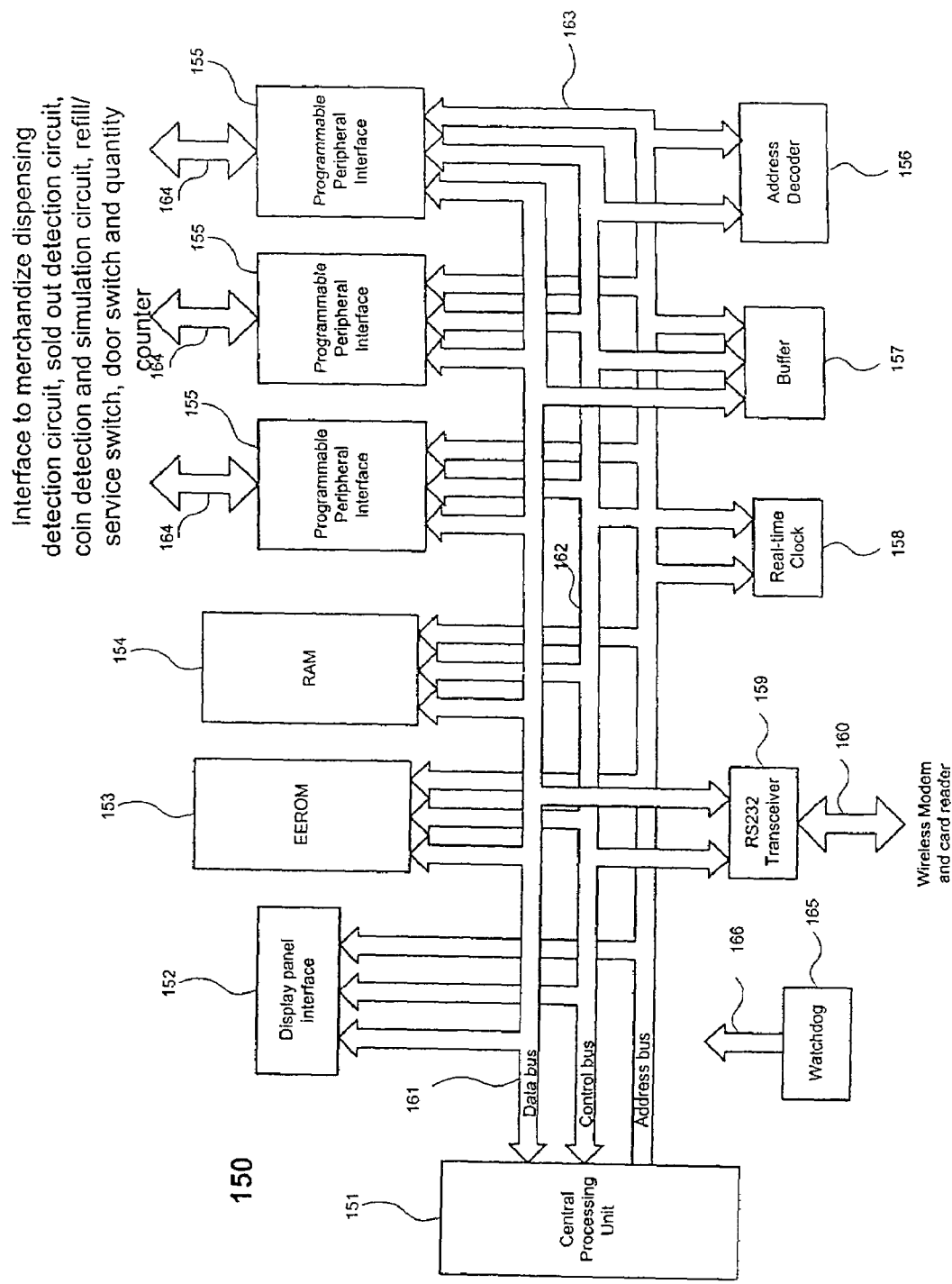
Fig. 4: Schematic diagram of the micro-controller circuit

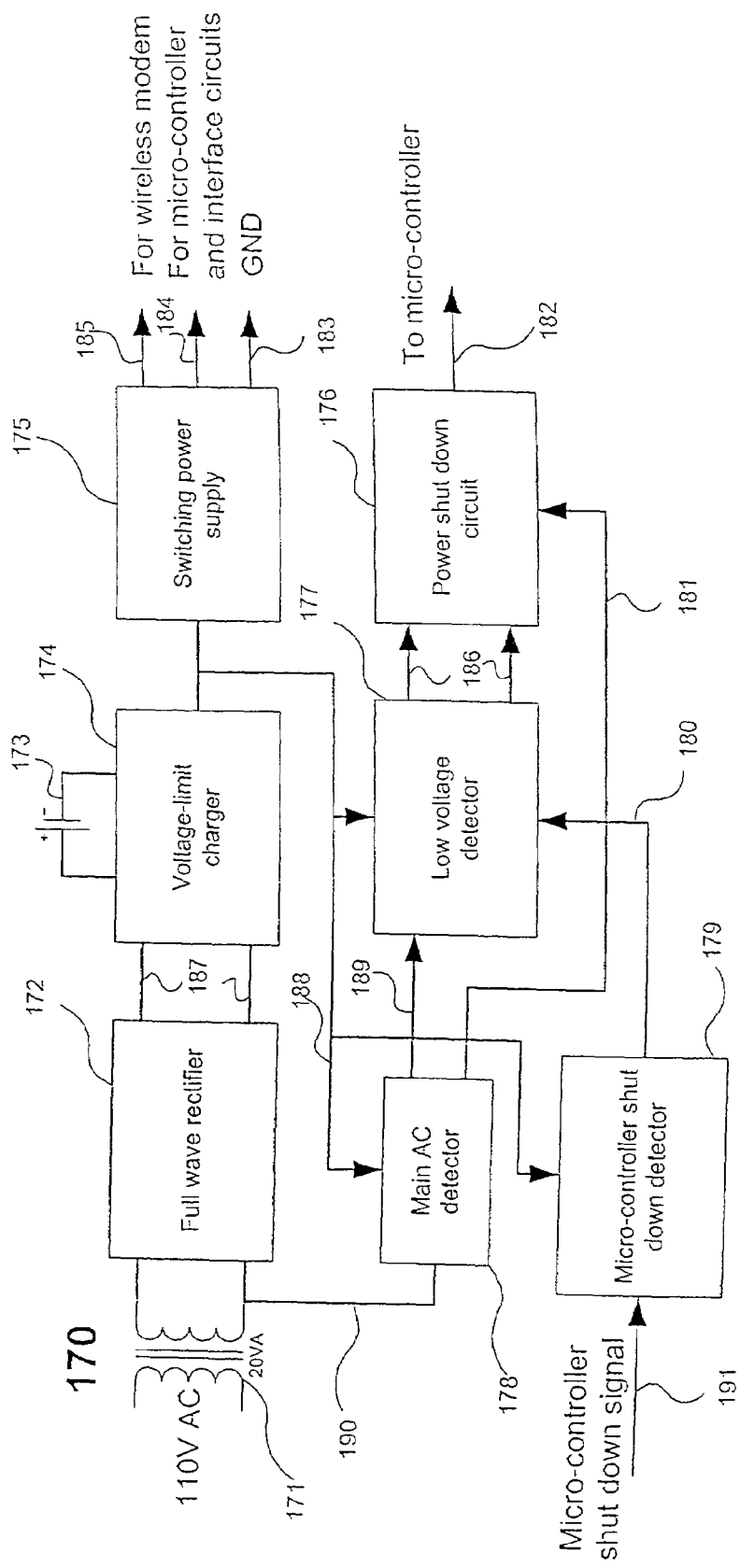
Fig. 5: Schematic diagram of the power management circuit

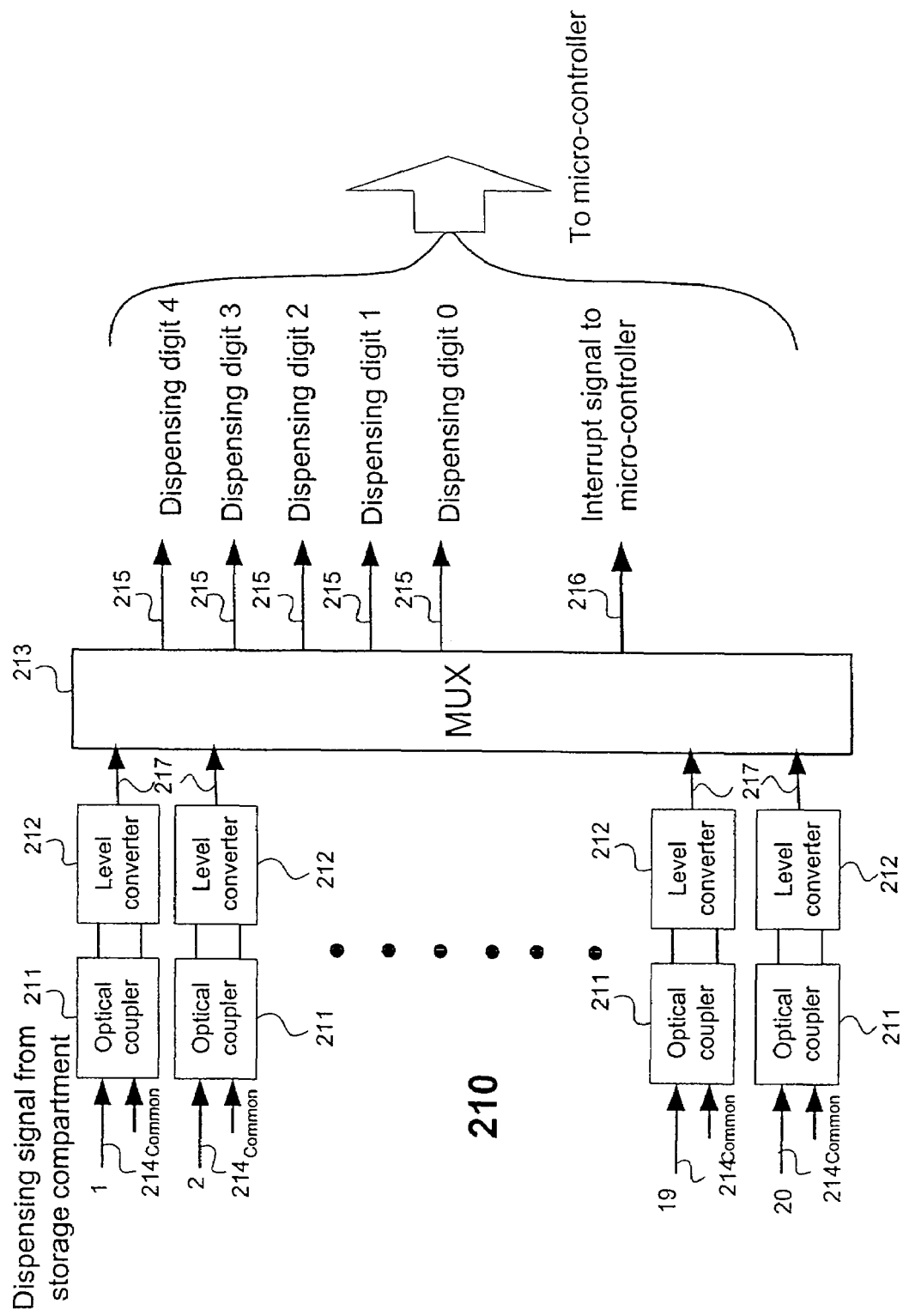
Fig. 6: Schmatic diagram of the merchandize dispensing interface circuit

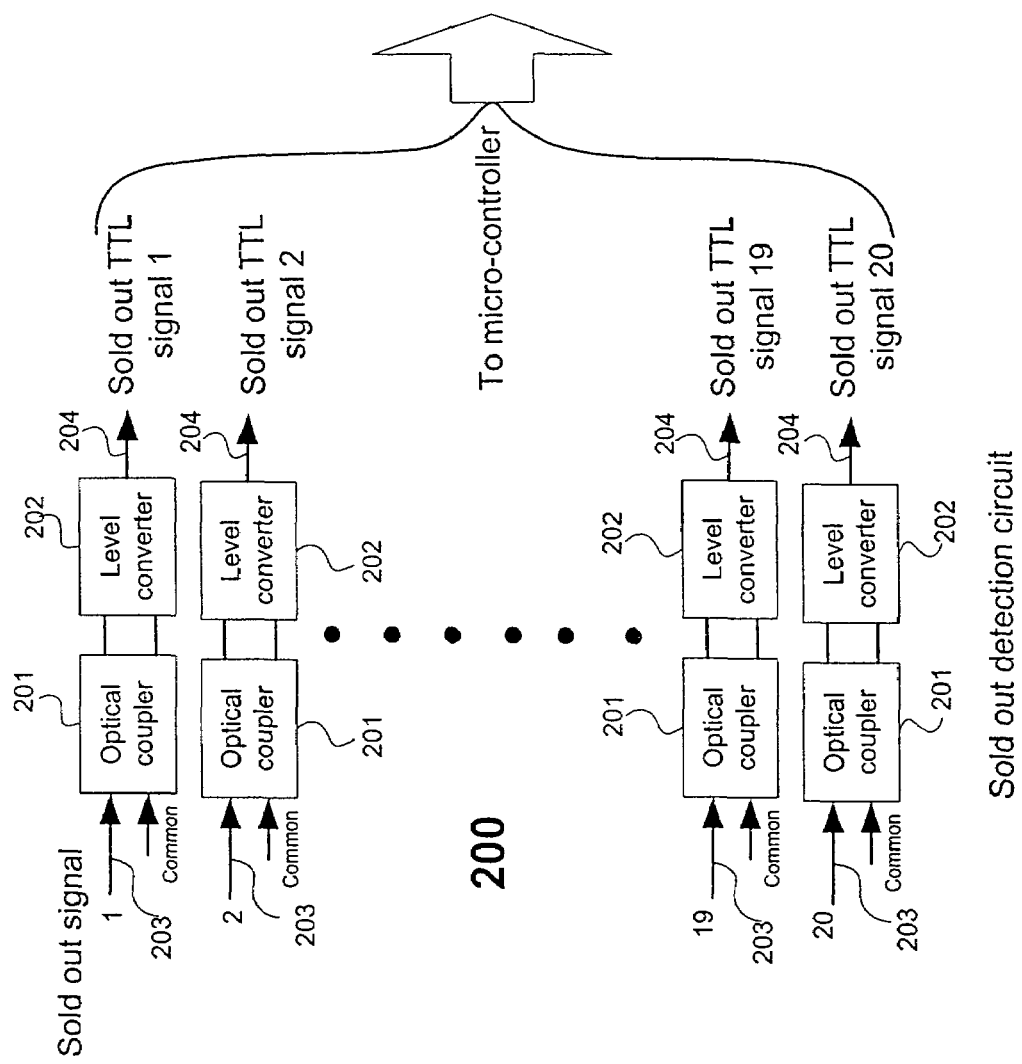
Fig. 7: Schematic diagram of the sold out interface circuit

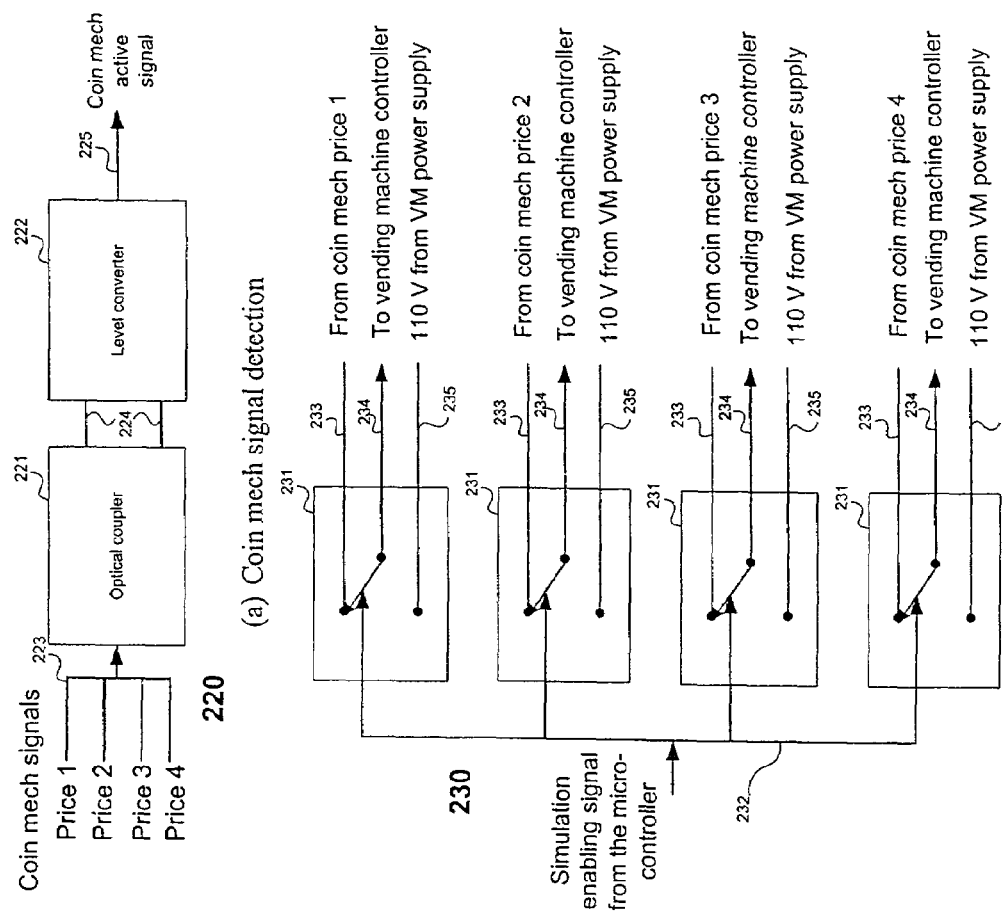
Fig. 8: Schematic diagram of the coin detection and simulation circuit

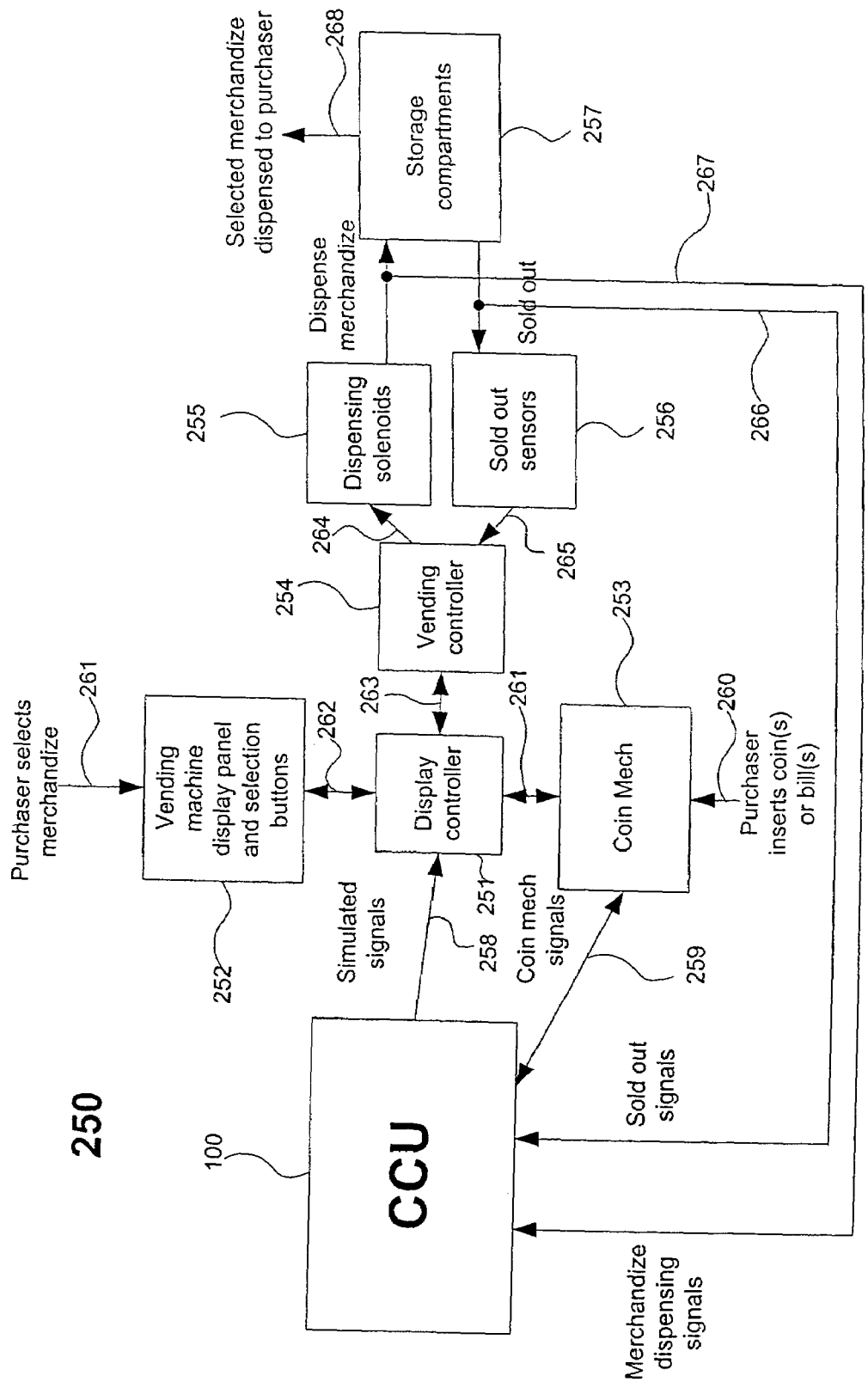
Fig. 9: Interfacing between the CCU and the vending machine of mechanical type

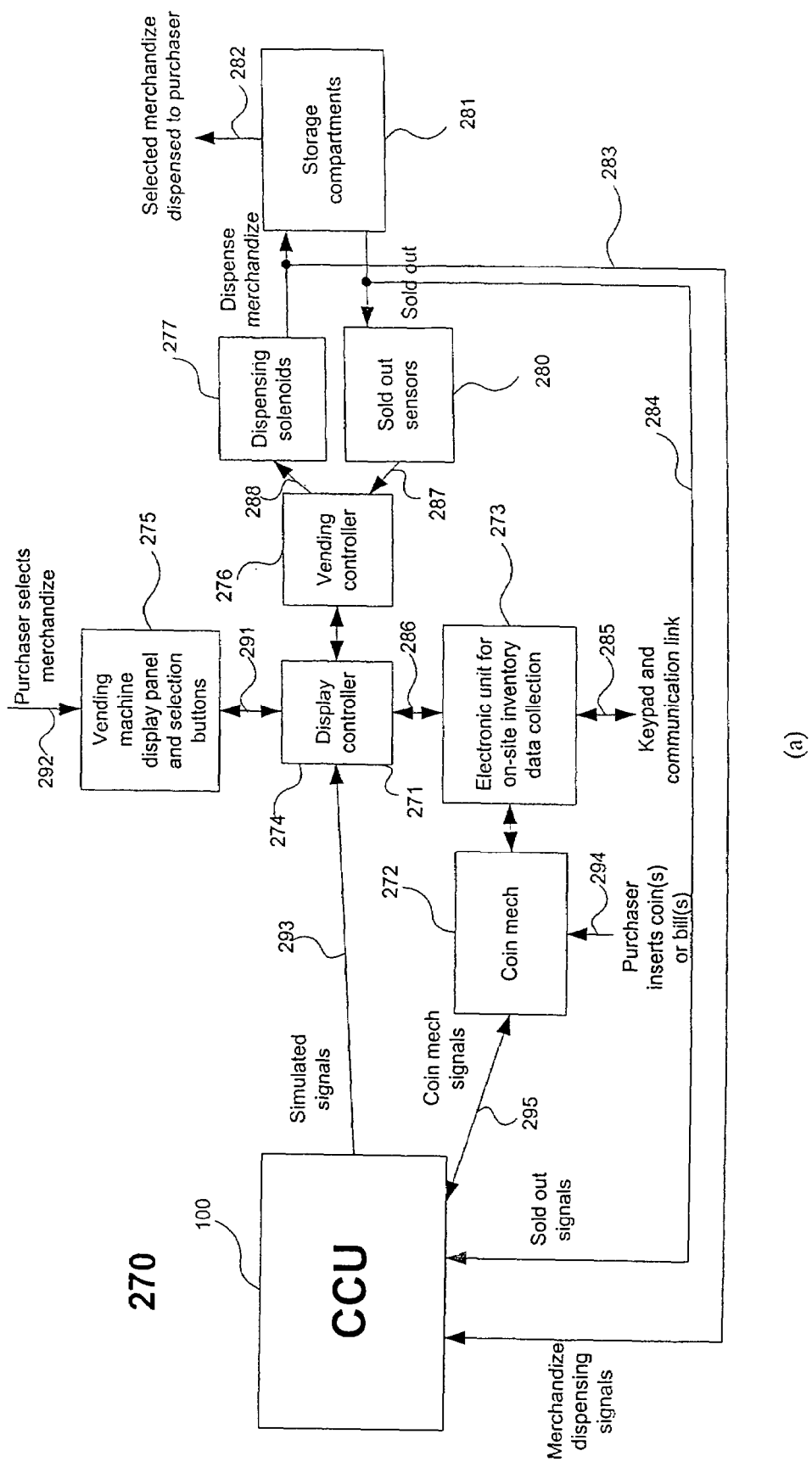
Fig. 10: Interfacing between the CCU and the vending machine of electronic type
(a)

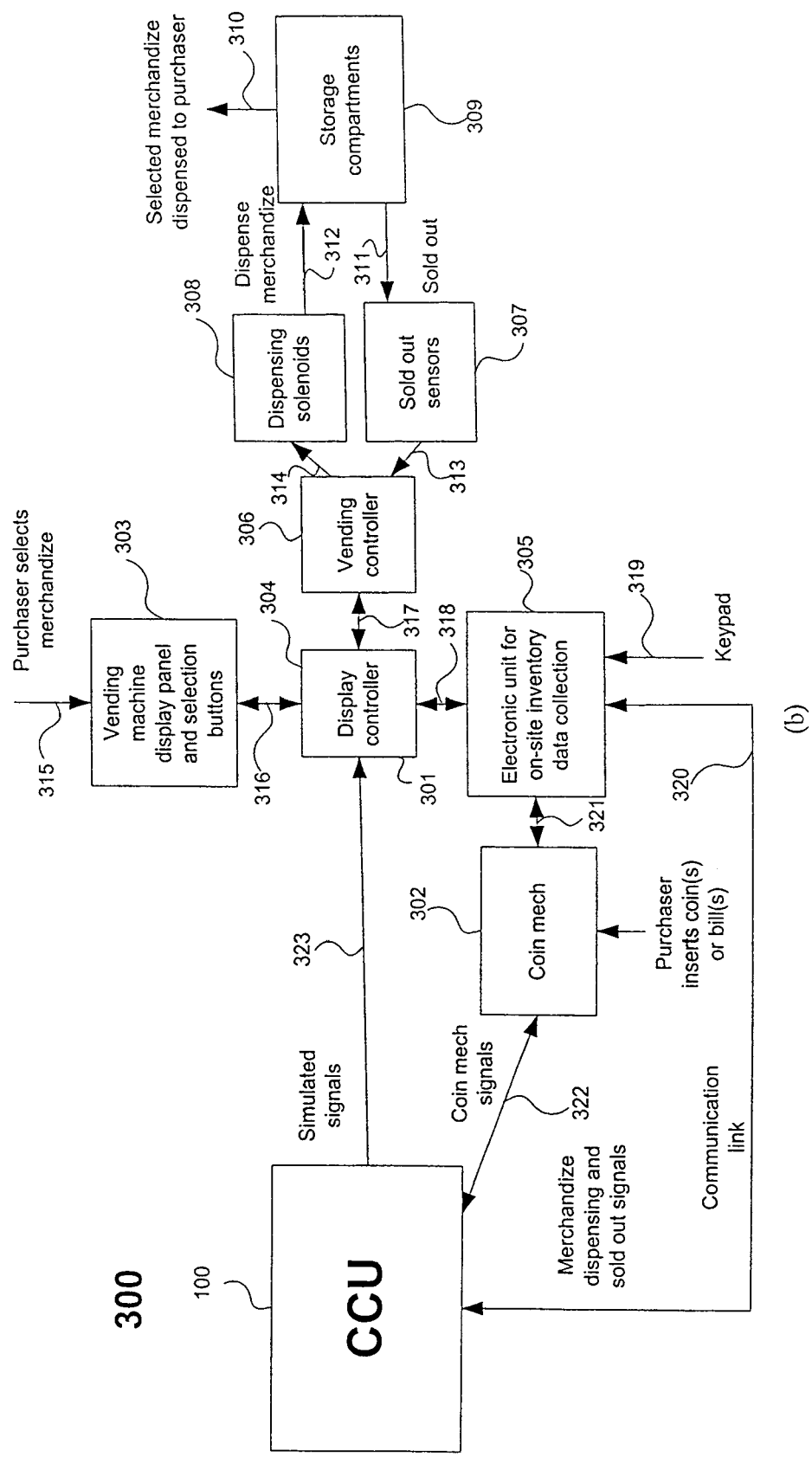
Fig. 10: Interfacing between the CCU and the vending machine of electronic type

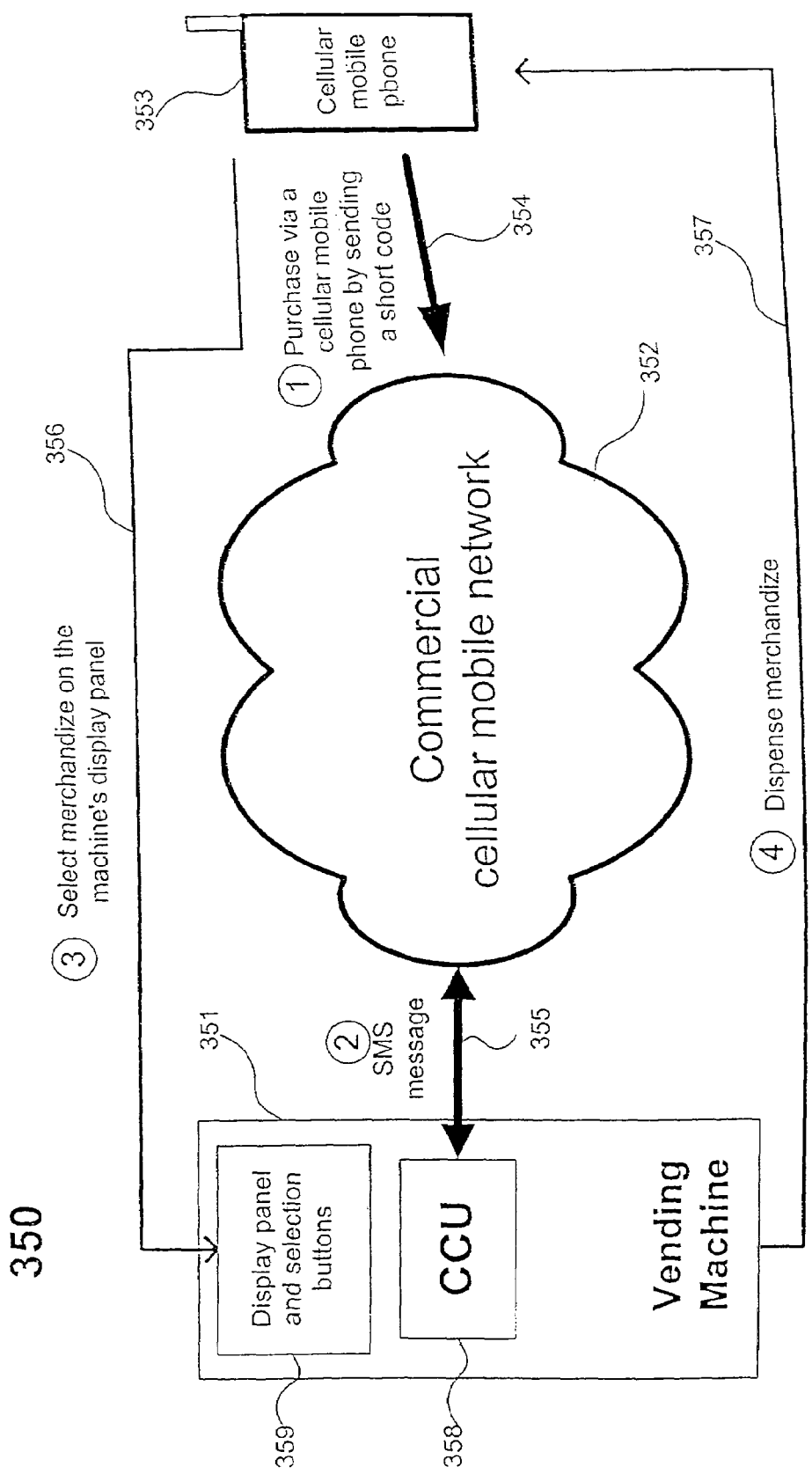
Fig. 11: Concept of wireless purchase through a cellular mobile phone

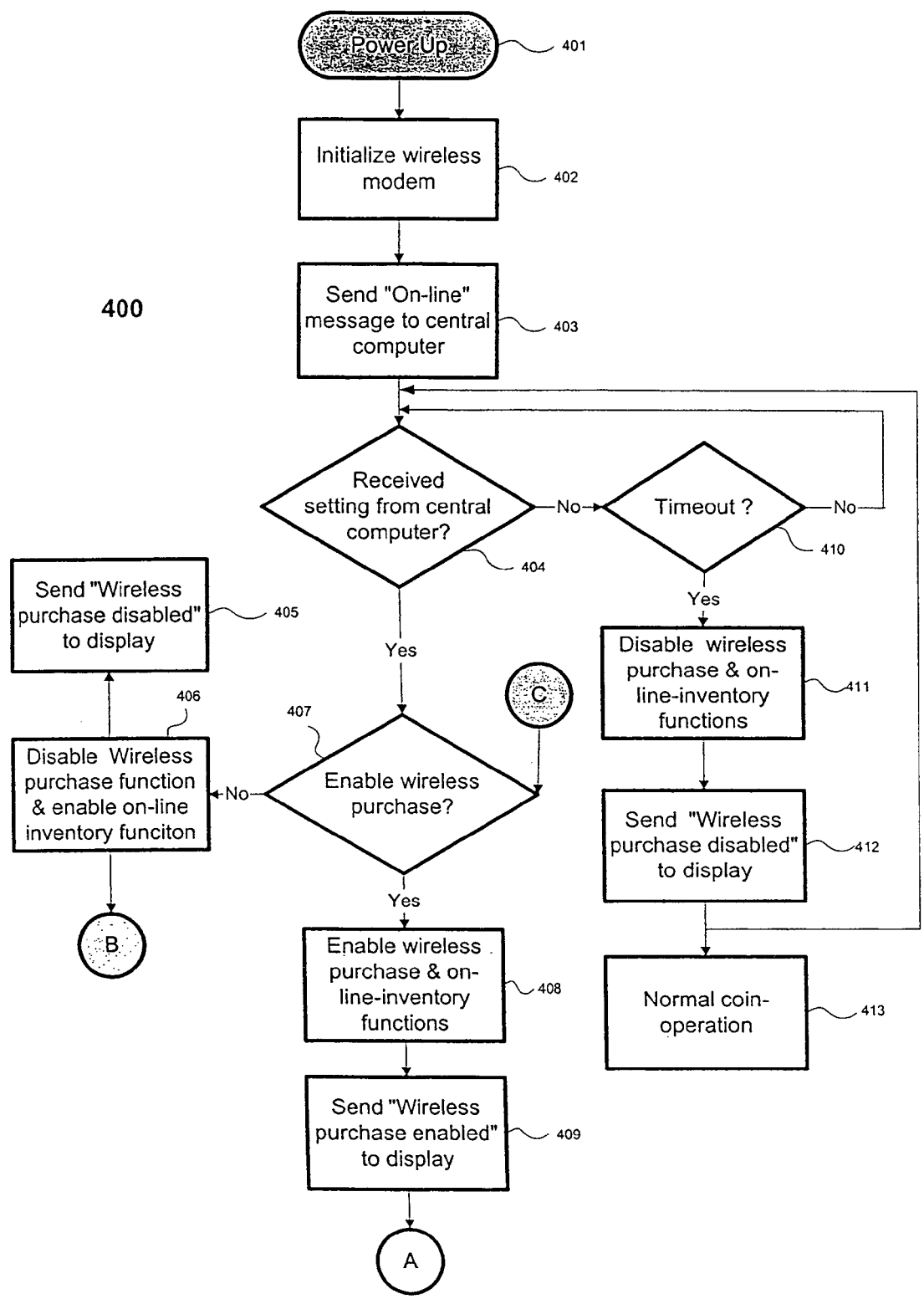
Fig. 12: Command and data flow of wireless purchase
(a)

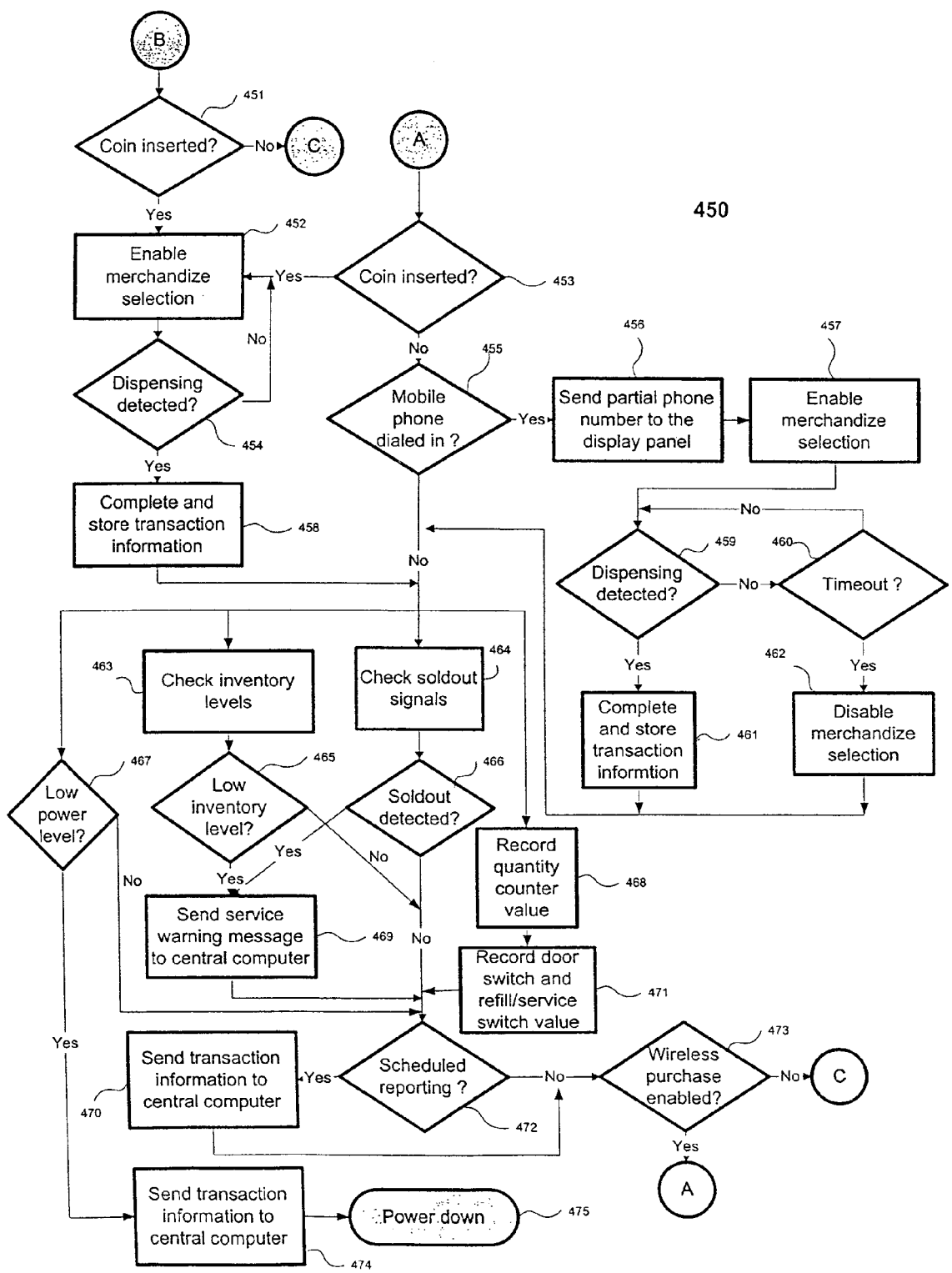
Fig. 12: Command and data flow of wireless purchase
(b)

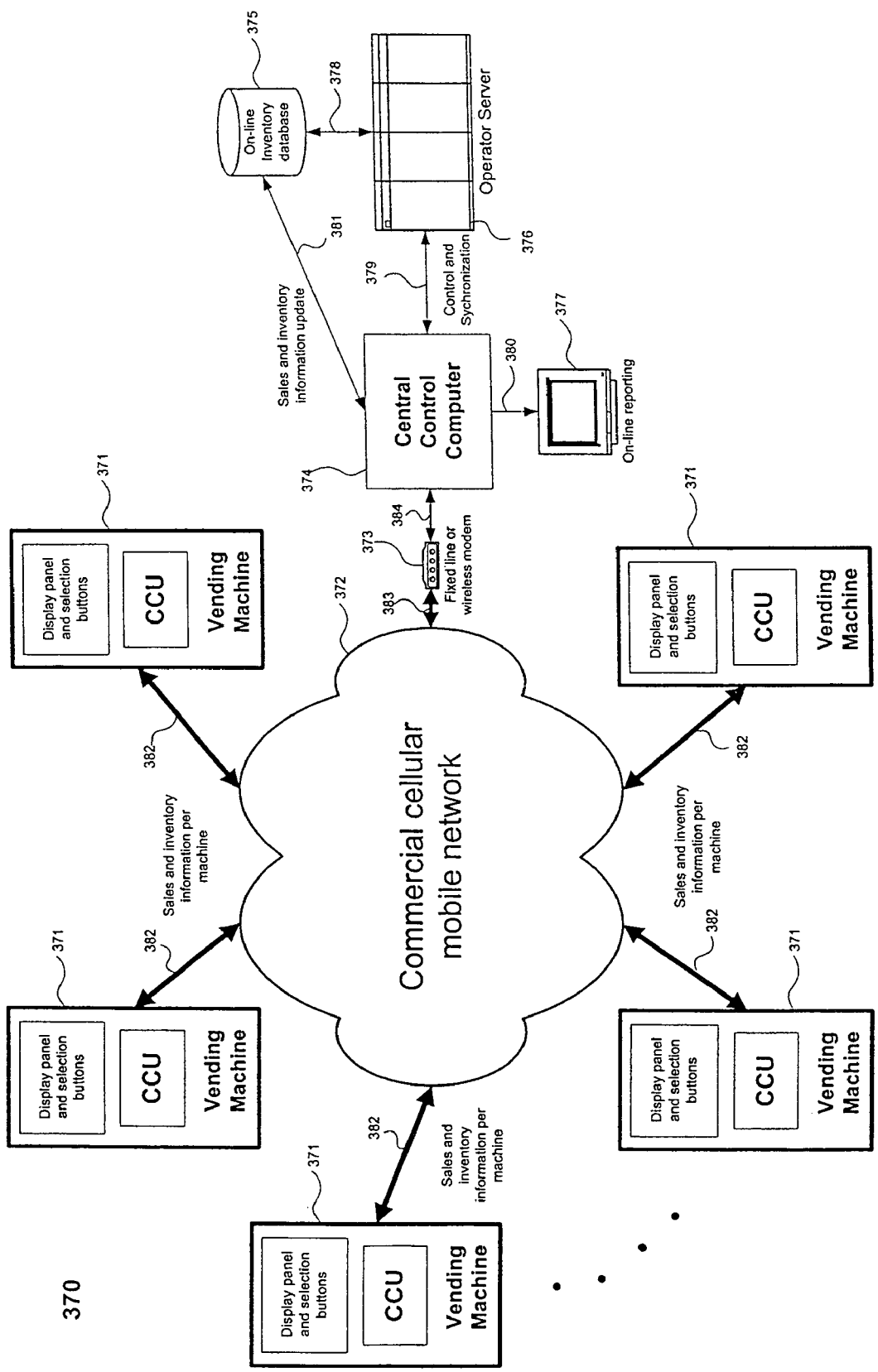
Fig. 13: On-line inventory management configuration

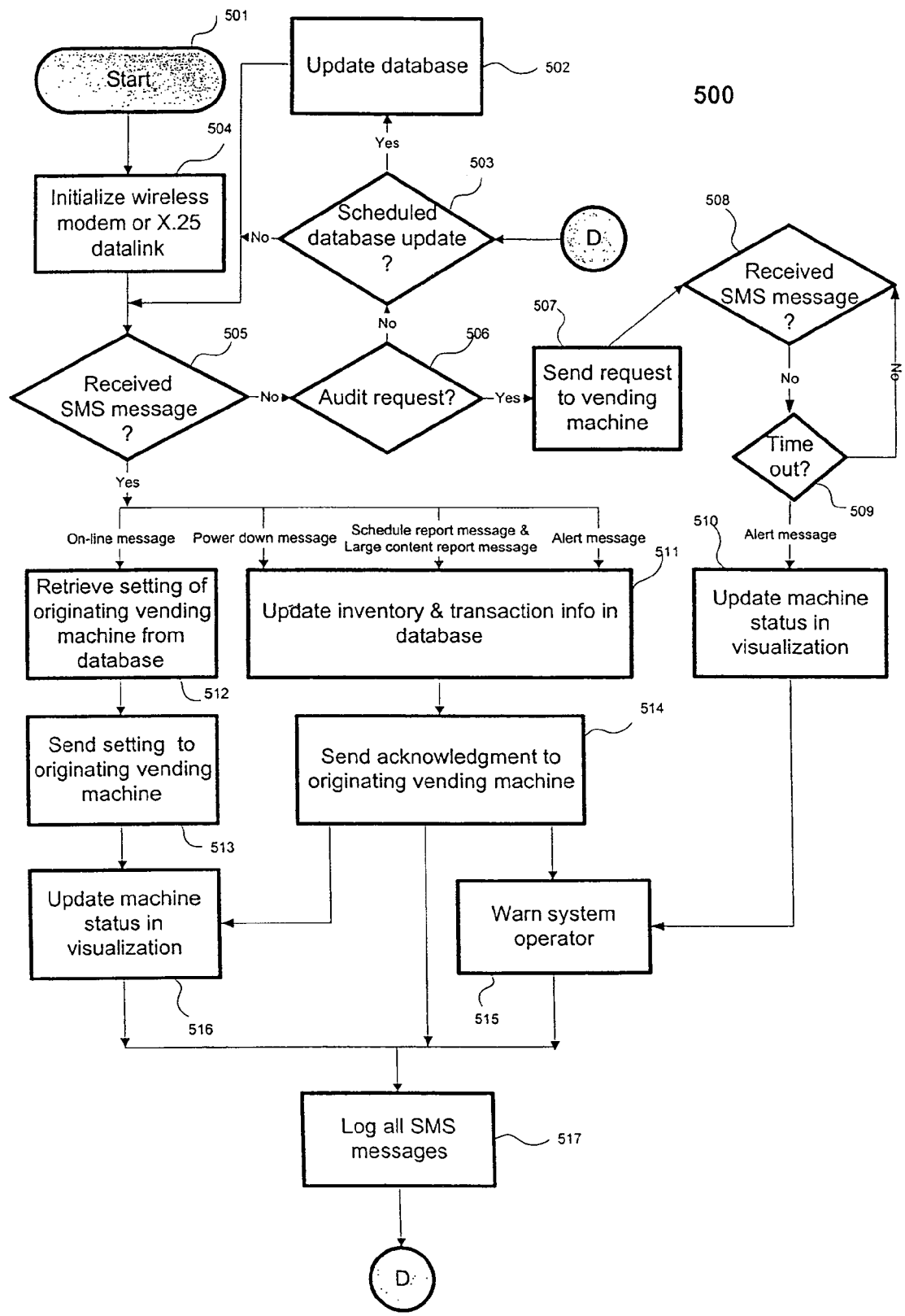
Fig. 14: Command and data flow of on-line inventory

WIRELESS PURCHASE AND ON-LINE INVENTORY APPARATUS AND METHOD FOR VENDING MACHINES

FIELD OF THE INVENTION

The present invention relates generally to an apparatus of and a method for wireless purchase of merchandise. In particular, the present invention relates to an apparatus of and a method for controlling wireless purchase from a vending machine by using a cellular phone. Further, the present invention relates to on-line inventory management, inventory data acquisition and monitoring, and vending machine control.

DESCRIPTION OF THE PRIOR ART

A "vending machine" generally refers to a coin-operated machine that automatically dispenses a merchandise upon the receipt of a payment equal to or greater than a predetermined sale price. Even though many vending machines are now designed to accept paper bills, electronic stored value cards, or credit cards as alternate payment methods, coin-operated vending machines remain the largest in number.

A major feature of vending machines is that the vending operation is fully automatic with no need of human supervision. Accordingly, various vending machines have been used at locations where it is not cost effective to have a normal manned merchandise outlet or where 24-hour sale service is needed. The merchandise dispensed from vending machines typically include drinks, food, tobacco, stamps, newspaper, parking tickets, phone cards, and etc. The storage compartments in a vending machine may contain different merchandise inventory at different predetermined sale prices.

Usually, vending machines are grouped into routes; one or more of these routes are managed by an operator. The operator sends service personnel to regularly refill the inventory, change merchandise, remove collected coins or bills, refill money changer, and perform other maintenance services. In most cases, refill and maintenance service is carried out based on historical figures, which is the service frequency depends on past history of a particular vending machine at a particular location. As sale patterns may vary among vending machines at different sites and at different times, the historical data may cause undesirable inefficiencies in the management of the vending machines. Accordingly, an automated method or apparatus is desired to collect on-line inventory data. Furthermore, the large number of cellular mobile phone users also creates the opportunity of payment by mobile phones. Therefore, it is desirable to provide a method or an apparatus allowing online payment for purchase made from vending machines.

A number of U.S. patents have addressed the aspect of vending machine inventory management. U.S. Pat. No. 6,056,194 issued to Brock Kolls on May 2, 2000 and entitled "System and Method for Networking and Controlling Vending Machines" discloses a vending machine control system and method for controlling vending of items from one or more vending machines operated by credit cards, debit cards, pre-pay cards, bills, or coins via a network.

U.S. Pat. No. 5,930,771 issued to D. S. Stapp on Jul. 27, 1999 and entitled "Inventory Control and Remote Monitoring Apparatus and Method for Coin-operable Vending Machines" uses bar code scanner to log inventory into a memory with each vending machine and uses cellular telephone interface and modem to transmit the vending information back to a central computer. The Stapp patent focuses on the bar code scanner embedded at racks and claims one cellular number used for a plurality of vending machines.

U.S. Pat. No. 5,794,144 issued to E. I. Comer et al. on Aug. 11, 1998 and entitled "Methods and Apparatus for Communicating Data via a Cellular Mobile Radiotelephone System" describes a data collection system based on cellular network control channel, together with a paging message system for acknowledgment. The Comer patent focuses exclusively on the use of the control channel in the cellular network and the paging approach.

U.S. Pat. No. 5,963,452 issued to T. Etoh et al. on Oct. 5, 1999 and entitled "System for Managing Sales of Goods for Vending Machines" discusses the use of frequency modulated sub-carrier broadcasting facility for communication between a goods control center and the terminal computers. The Etoh patent focuses on the control of the vending machines via control commands from the control center, and extracting market information of the vending machines.

U.S. Pat. No. 4,412,292 issued to J. K. Sedam et al. on Oct. 25, 1983 and entitled "System for the Remote Monitoring of Vending Machines" describes a system using telephone line to communicate information obtained by a microprocessor in a vending machine. The Sedam patent focuses mainly on a plurality of sensors in a vending machine to establish alert conditions and to control inventory, route planning of the machines.

Although the above U.S. patents disclose systems using cellular telephone network to communicate for on-line inventory control purpose, none of these patents discusses the use of the short message service (SMS) protocol. Furthermore, apart from inventory control, none of the patents discloses using a cellular mobile phone to purchase merchandise and to make the payment, let along a fully integrated solution to the purchase and on-line inventory problem.

SUMMARY OF THE INVENTION

The present invention provides an alternate merchandise purchasing method that can co-exist with all the other purchasing schemes, including coins, bills, stored value cards, or credit cards available to vending machines.

The present invention also integrates the purchasing function with the online inventory function so that a single apparatus can handle the purchase of merchandise, monitor the inventory, and communicate with a central computer.

The present invention relates to an apparatus and a method for wireless purchase of merchandise from a vending machine by using a cellular mobile phone. The present invention permits a cellular mobile phone user to dial a sequence of code on the phone to invoke the vending machine to dispense merchandise, where payment is charged to the mobile phone account. The present invention also relates to an apparatus and a method for on-line inventory management. With on-line inventory management, the present invention provides high efficient operation, reduced operation cost, and just-in-time service and merchandise delivery. The present invention further relates to an apparatus and a method that allow both on-line inventory management and wireless purchase of merchandise in a vending machine.

The apparatus and method of the present invention have at least the following features that are not found in any of the existing vending machines. (1) The present invention is generic enough to be integrated into either mechanical type or electronic type vending machines. (2) The present invention uses wireless modem that communicates with other mobile phones or a central computer via the commercial cellular mobile network. (3) The present invention uses the SMS protocol. The inventory data is further encoded with cyclic redundancy code for error checking. (4) The present invention employs the micro-controller technology and utilizes mixed-mode analog-digital circuit interfacing technologies for data acquisition, processing and storage. (5) The present invention provides a method of inventory data protection against data loss due to power failure, transient, or intentional power down. (6) The present invention is fully programmable and can be programmed to perform a multitude of tasks. (7) The present invention is based on a distributed architecture that each vending machine in the plurality of vending machines operates independently, without requiring authorization from a central computer. (8) The present invention is designed to co-exist with other payment devices. (9) The present invention deployed in large numbers, with low probability of communication congestion.

In the present invention, each vending machine is equipped with a control and communication unit (CCU). The CCU can comprise one or more of the following: a micro-controller, a cellular mobile phone modem, a power management circuit, a battery, a display panel, a quantity counter interface, a refill/service switch interface, a door switch interface, a reset switch, a coin mech signal detection and simulation circuit, a merchandise dispensing interface circuit, a merchandise selection interface circuit, and a sold out interface circuit. The CCU can be connected to an AC power supply derived from the vending machine and further connected to the sold out circuit, the merchandise dispensing device, the coin mech, and the counter of the vending machine.

The micro-controller is capable of running a resident program in the read-only memory of the micro-controller to carry out various actions. Exemplary actions performed by the micro-controller are shown below without any particular order. (1) The micro-controller can serve interrupting signals from the sold out circuit, the dispensing circuit, the quantity counter, the refill/service switch, the door switch, and/or the reset switch. (2) The micro-controller can encode and pack the inventory data into a format and size suitable for SMS communication. (3) The micro-controller can detect the presence of the coin mech signal and arbitrate between the coin or card purchase and the cellular phone purchase. (4) The micro-controller can enable the coin mech simulation signals to initiate a vending transaction. (5) The micro-controller can record the quantity counter and refill/service switch signals and include that as part of the inventory data. (6) The microcontroller can display part of the cellular mobile phone number or other messages on the display panel. (7) The micro-controller can initiate and control the communication with a central computer via a wireless modem. (8) The micro-controller can control and receive data from a central computer and then take appropriate actions. (9) The micro-controller can control and receive data from a purchaser's phone, verify the coded sequence, and initiate the purchase. (10) The micro-controller can perform a software reset when the reset switch is pressed. (11) The micro-controller can record the date and time when the door switch is activated. Other standard functions of the micro-controller may include management of the on-board memory banks and referencing the real-time clock.

The functions of the sold out interface circuit, the merchandise dispensing interface circuit, the quantity counter, and the refill/service switch can be broadly viewed as inventory data collection. These components are capable of collecting one or more types of the following information: sold out data, the storage compartment from which the merchandise is dispensed, the total number of merchandise sold since the day of first installation, and the type of service carried out.

The functions of the coin mech signal detection and simulation circuit are to detect and simulate the coin mech signals under certain situations. When an appropriate payment of coins has been inserted through and accepted by the coin mech, the coin mech signals are active. The coin mech signals then drive a converter in the vending machine to allow a purchaser to select merchandise on the display panel of the vending machine via a number of buttons. On the other hand, when a wireless purchase is carried out, equivalent signals are simulated to activate the display panel and selection buttons for merchandise selection. To prevent signal contention, any coin mech signals, if active, must be detected. Once detected, the coin mech signals can interrupt the micro-controller, which can then serve the interrupt by disabling the wireless purchase in the earliest instance. It will be appreciated that other payment devices may be similarly interfaced with the vending machine. The payment priority can be determined as desired in advance for a smooth vending operation.

The display panel is capable of displaying partial phone number of the purchaser whose purchase request the vending machine is serving at the time. Therefore, the display function can notify the purchasers of the ongoing transaction. Because the display panel shows only part of the phone number, there is no concern of violating privacy. The display panel can also be used to display other messages during the system start-up, system testing, and cash transaction.

The power management circuit is capable of providing the required power supply to the micro-controller and its peripheral devices when an AC power supply is applied. Additionally or alternatively, the power management circuit is capable of providing a backup battery supply when the AC power supply is removed or unstable. When the latter occurs, the power management circuit detects a voltage drop and starts counting in a timing loop. During the voltage drop period, the backup battery is used as power supply. However, the battery is not intended for carrying out normal operations. If the voltage drop lasts after a predetermined period of time has elapsed, the power management circuit signals the micro-controller that a power down condition has occurred. Upon receiving this confirmation, the micro-controller immediately forwards all the vending transaction information obtained since the last reporting time to a central computer. The micro-controller enters into a sleeping mode to conserve battery power after sending all the information and receiving an acknowledgment from the central computer. If the voltage level returns to the normal level within the predetermined period of time, the power management circuit switches back to the AC power supply. Normal operations resume.

The wireless modem is capable of establishing a communication link with the purchaser's mobile phone and/or with a central computer. As a cellular mobile phone modem, it can receive and transmit SMS over the existing commercial mobile network. When a purchaser dials the code from a cellular phone, the phone communicates with the wireless modem. The wireless modem in turn sends an interrupt to the micro-controller. The micro-controller serves the interrupt by turning on the display buttons on the panel of the vending machine to allow the purchaser select merchandise via the buttons. As to the communication between the vending machine and a central computer, the communication can be both directions. On one hand, the micro-controller is capable of automatically packing the vending transaction information and transmitting them to the central computer, when a predetermined period of time has elapsed, or an alert level becomes active, or the contents of the transaction information has reached a certain size in the memory storage. On the other hand, the central computer is capable of requesting for vending transaction information by sending a SMS to the vending machine where, after verifying the sender identity, the micro-controller automatically packs the vending transaction information since the last reporting time and transmits them to the central computer.

When a plurality of vending machines are employed in a wireless purchase and on-line inventory management apparatus, each vending machine can be identified uniquely by a central computer through an identification phone number. Such identification phone number differs from the short code used for wireless purchase and is unknown to the purchasers. The identification phone number is used by all the backend operations to identify the machine or the inventory data associated with the machine. The central computer can consist of one or more of the following: a Windows NT computer, an X.25 data modem card, an X.25 data line connecting the computer to the mobile network provider, a gateway service program, a control program, and a database. The use of the X.25 data link instead of a wireless modem is to ensure high communication integrity. The gateway service program can control the data line operation and buffering. The control program is capable of interfacing with the gateway service program, supporting visualization, controlling data flow, manipulating data, keeping log of the incoming and outgoing data and events, and writing data into a database. The database is capable of collating the data for data analysis, route planning, inventory control, and other management purposes.

BRIEF DESCRIPTION OF THE DRAWINGS

The present invention will become more apparent from the following description in conjunction with the accompanying drawings, in which:

FIG. 1 is a block diagram depicting a vending machine of a mechanical type;

FIG. 2 is a block diagram depicting a vending machine of an electronic type;

FIG. 3 is a block diagram of the control and communication unit (CCU) of the present invention;

FIG. 4 is a schematic diagram of the micro-controller circuit of the present invention;

FIG. 5 is a schematic diagram of the power management circuit of the present invention;

FIG. 6 is a schematic diagram of the merchandise dispensing interface circuit of the present invention;

FIG. 7 is a schematic diagram of the sold out interface circuit of the present invention;

FIG. 8 is a schematic diagram of the coin detection and simulation circuit of the present invention;

FIG. 9 depicts the interface between the CCU and the vending machine of a mechanical type of the present invention;

FIG. 10 depicts the interface between the CCU and the vending machine of a electronic type of the present invention;

FIG. 11 depicts the concept of wireless purchase through a cellular mobile phone of the present invention;

FIG. 12 depicts the command and data flow of wireless purchase of the present invention;

FIG. 13 depicts the on-line inventory management configuration of the present invention; and FIG. 14 depicts the command and data flow of on-line inventory of the present invention.

DETAILED DESCRIPTION OF THE PREFERRED EMBODIMENTS

Exemplary wireless purchase and on-line inventory apparatus and method embodying the principles of the present invention are shown throughout the drawings. Currently, two types of vending machines are commonly used. They are the mechanical type vending machine 10 and the electronic type vending machine 30 as illustrated in FIG. 1 and FIG. 2, respectively. The difference between the two types of vending machines 10 and 30 is that the electronic type vending machine 30 has an additional electronic unit 34 that can log and store inventory data locally in the vending machine. By using a keypad attached to the electronic unit 34, the user may control the dispensing mechanism, select storage compartments, and/or run a series of tests to verify the operation of the vending machine 30. A printer can also be attached to the electronic unit 34 for printing inventory data. Both types of vending machines 10 and 30 can have other electrical circuits for lightings, condensers, motor, compressor, and thermostats for the storage of merchandises, depending on the type of merchandises on sale. The following description focuses on the vending operation of the vending machines 10 and 30.

FIG. 1 is a block diagram showing an exemplary mechanical type vending machine 10. The vending machine 10 may consist of a vending controller 11 for controlling the vending operation, a coin mech 13 for receiving payment, a display controller 15 for driving a display panel and selection buttons 12, and a number of storage compartments 16 for keeping merchandises 20. It is understood that the vending machine 10 can be varied as desired. For a mechanical type vending machines 10, purchase is made through the coin mech 13. The coin mech 13 can be configured to accept 19 payment, such as tokens, coins or paper money. After receiving a payment, the coin mech 13 can output a purchase signal 21 to the display controller 15. The coin mech output signal 21 can be in AC and represent different price levels and other control functions that can be adjusted in the coin mech 13 itself.

Upon receipt of the purchase signal 21, the display controller 15 then drives the display panel and the selection buttons 12 allowing the user to select merchandises 20. The display panel can display the types of merchandises 20 that can be purchased from the vending machine 10. The display panel can be either an LCD or an LED. Additionally or alternatively, the display panel can include one or more selection buttons for the user to select the merchandises 20. The selection buttons can be associated with the storage compartments 16 in various manners. In an exemplary embodiment, one selection button corresponds to one or more storage compartment 16.

Each storage compartment 16 can be constructed to contain one or more merchandises 20 of the same type or of different types. The storage compartment may have a dispensing member 17, such as a dispensing solenoid, adapted to dispense one piece of the merchandises 20. In an exemplary embodiment, the dispensing solenoid 17 can mechanically move 22 a device holding the merchandise 20 and, as a result, dispenses 27 a piece of merchandise 20 from that storage compartment 16. When a button on the display panel is pressed, a selection signal 24 is sent to the vending controller 11. The vending controller 11 can then activate the dispensing member 17 corresponding to the selected storage compartment 16. After the merchandise 20 is dispensed, the dispensing member 17 or the storage compartment 16 sends a return signal 21 to the coin mech 13 and the display controller 15 to confirm the completion of the transaction.

In an alternative embodiment, a sold out sensor 14 can be provided for detecting the absence of any merchandise 20 in any storage compartment 16. In an exemplary embodiment, each storage compartment 16 is connected with a sold out sensor 14. If an absence condition is detected in a storage compartment 16, the sold out sensor 14 can return 23-26-24 an active sold out signal to the display controller 15. The display controller 15 can then disables the corresponding selection button(s) on the display panel.

FIG. 2 is a block diagram showing an exemplary electronic type vending machine 30 that can include similar vending functions to those of the mechanical type vending machine 10 as described above. In addition, the electronic type vending machine 30 can have an electronic unit 34 that interfaces 43, 46 with the coin mech 13 and the display and vending controllers 31, 33. The electronic unit 34 is capable of recording vending transaction information, such as information about what storage compartment 16 has dispensed and/or what storage compartment 16 has sold out. The vending transaction information can be stored in various formats, such as a proprietary format for down-loading onto a printer on-site. Additionally or alternatively, the electronic unit 34 can be adapted to control the vending operation during the service. In an exemplary embodiment, the electronic unit 34 can interface 47 with a keypad to control the dispensing directly or run a series of tests on the display and vending controllers 31, 33. It is understood that the vending machine 30 can be varied as desired.

FIG. 3 is a block diagram depicting a preferred embodiment of a control and communication unit (CCU) 100 formed according to the principles of the present invention. The CCU 100 may comprise a micro-controller circuit (MC) 150 with a power management circuit 170, a coin simulation interface (CSI) circuit 230 for communicating with a vending machine, and a wireless modem interface circuit 112 for communicating with a network.

As shown in FIG. 3, the CCU 100 can also have a parallel interface circuit including one or more of the following circuits: a sold out interface (SOI) 200, a merchandise dispensing interface (MDI) 210, a coin detection interface (CDI) 220, and a card reader interfacing circuit (CIC) 105. The interface circuits for the SOI 200, the MDI 210, the CDI circuit 220, and the CSI circuit 230 are capable of performing level shifting and isolation between the signal levels 118, 119, and 122 used by the vending machine and the standard TTL signal level used by the micro-controller. The interface between the CIC 105 and a card reader (not shown) is carried out via a serial link 120. In another preferred embodiment, the CDI circuit 220 and the CSI circuit 230 can be combined to form a coin detection and simulation interface (CDS) circuit. The CDS can form a portion of the above parallel interface circuit.

In a preferred embodiment, the CCU 100 can further have one or more of the following circuits: a display panel interface circuit 101, a quantity counter interface circuit 102, a refill/service switch interface 103, and a door switch interface 104. The display panel interface circuit 101 is capable of communicating a message pertaining a wireless purchase from the MC 150 to the display panel of the vending machine. For example, messages, such as a portion of the phone number of the purchaser, can be shown on the display panel during the wireless purchase to indicate whose merchandise is being dispensed. The quantity counter interface circuit 102 is capable of communicating between the MC 150 and the quantity counter. The interface between the door switch and quantity counter is also in parallel 125, 126. The interface with the display panel may differ from the rest because there may not be level shifting or isolation through a parallel data line 124. It will be appreciated that various alternate embodiments of the CCU 100 are within the scope of the present invention.

The micro-controller circuit (MC) 150 is the computing core of the CCU 100, where all input data 114, 115, 116, 117, 121, 125, 126, and 130 are stored and processed as described below. It will be appreciated that the MC 150 can also perform other output functions, such as (a) enabling the coin mech signal simulation via a parallel interface with level shifting 121, (b) displaying information on the display panel through a parallel interface 124, and (c) transmitting via the cellular mobile channel 113 all the transaction information to a control center via a serial data link 114. In a preferred embodiment, the MC 150 can include a DC power supply 127, which can be derived from the power management circuit 170. The power management circuit 170 can be generated either from an AC supply 110 or a battery 173 determined by the AC supply 110 as described in greater detail below.

FIG. 4 depicts a preferred embodiment of the MC 150 formed according to the principles of the present invention. The MC 150 can comprise a central processing unit 151 and one or more of the following devices: a memory bank 152, a plurality of programmable peripheral interface devices (PPI) 155, an address decoder 156, a buffer 157, a clock such as a real-time clock 158, a transceiver such as an RS232 serial transceiver 159, and a watchdog circuit 165. The memory bank 152 may include a read only memory 153, such as an electrically programmable read only memory (EPROM), and a random access memory (RAM) 154.

The central processing unit (CPU) 151 in the MC 150 can communicate and control the other devices through a data bus 161, a control bus 162, and an address bus 163. In a preferred embodiment, the CPU 151 is capable of executing a program stored in the EPROM 153 that performs initialization of devices in the circuit. The CPU 151 can also process the data to and from the PPI 155 and communicate through an RS232 port 160 with a wireless modem and onto a central computer. Further, the CPU 151 can communicate with a card reader via the RS232 port 160. The data processing tasks performed by the CPU 151 may include, but not be limited to, servicing interrupts from the various interface circuits, the quantity counter, and the refill/service switch, displaying appropriate messages and information on the display panel, and detecting AC power down condition from the power management circuit 170. It will be appreciated that various alternate embodiments of the CPU 151 are within the scope of the present invention.

The memory bank 152 in the MC 150 is capable of storing various program/information of the CCU 100. In a preferred embodiment of the present invention, the system control program may be stored in the EPROM 153 while the vending transaction information may be stored in the RAM 154. The vending transaction information can be accumulated until a predetermined time period is reached, or a request is received from the central computer, or a predetermined maximum number of vending transactions is reached. Then, the vending transaction information is packed into an SMS format and sent to the central computer. It will be appreciated that various alternate embodiments of the memory bank 152 are within the scope of the present invention.

The PPI 155 in the MC 150 is adapted to establish communication and data flow 164 between the CPU 151 and one or more of the following: the merchandise dispensing interface circuit 210, the sold out interface circuit 200, the coin detection and simulation circuit 220, 230, refill/service switch 103, door switch 104, and quantity counter 102. In a preferred embodiment, the communication and data flow 164 can be one or more of the following: merchandise dispensing signals, sold out signals, coin detection and simulation signals, refill/service confirmation, door switch signals, and quantity counter signals. The MC 150 can thus directly control the display panel and send messages to the display panel at different execution stages of the program.

The address decoder 156 in the MC 150 can be used to decode addresses for the PPI 155, the RAM 154, the EPROM 153, the display panel, and/or the clock 158. An additional buffer 157 can be used for storing data from the PPI 155 after an interrupt, which is forwarded to the CPU 151 in due course.

In a preferred embodiment, the clock 158 is a real-time clock for time and date stamping the transaction information. The clock 158 can be calibrated with the time obtained from the cellular mobile network when the system first starts up. Additionally or alternatively, the clock 158 can be regularly calibrated from the same time source. A watchdog circuit 165 can also be included in the micro-controller circuit to provide software reset 166 to the CPU 151 if and when the firmware execution is irregular. It will be appreciated that various alternate embodiments of the MC 150 and its various components are within the scope of the present invention.

FIG. 5 depicts a preferred embodiment of the power management (PM) circuit 170. The PM 170 may comprise one or more of the following: a full-wave rectifier 172, a battery 173, a voltage limit charger 174, a switching power supply 175 for the micro-controller 150, an AC main detector 178, a low voltage detector 177, a power shut down circuit 176, and a micro-controller shut down detector 179. It will be appreciated that various alternate embodiments of the PM 100 or its components are within the scope of the present invention.

Driven by an AC supply 171, the full-wave rectifier 172 may produce a smooth DC voltage 187 that can be used to charge the battery 173. In a preferred embodiment, the voltage-limit charger 174 charges the battery 173 with variable current values. The output 188 of the charger 174 is used to drive a switching power supply circuit 175. The switching power supply circuit 175 can provide necessary output voltage levels 185, 184, and 183 to drive the wireless modem 112, the MC 150, and other circuits.

The main AC detector 178 can detect any drop in the AC supply 171. The AC supply drop can result from unstable power caused by a transient, power failure, or the termination of power supply. Upon detecting this condition, the main AC detector 178 returns an active signal 181 to the MC 150 via the power shut down circuit 176. As the switching supply 175 is connected to the battery charger 174 and the battery 173, the power supply to the micro-controller 150 can then be taken over by the battery 173.

When the MC 150 receives an active signal 182 from the power shut down circuit 176, the MC 150 completes all the current transactions before forwarding all the vending transaction information to the central computer. If the duration of the active signal 182 is more than a predetermined period of time, the MC 150 enters into a shut down state and disables the wireless purchase and on-line inventory functions. Otherwise, the MC 150 will restores its full set of functions. When the MC 150 enters into a shut down state, the MC 150 sends a shut down signal 191 to the MC shut down detector 179. The MC shut down detector 179 then outputs a signal 180 to the low voltage detector 177 and turns off the supply to the MC 150 and the wireless modem 112. The low voltage detector 177 can also detect the output voltage level of the battery 173. If the output voltage level is low, an active signal 186 is returned to the MC 150 via the power shut down circuit 176. Supply can be restored when the main AC detector 178 detects the main AC power supply again.

FIG. 6 depicts a preferred embodiment of the merchandise dispensing interface (MDI) circuit 210 formed according to the principles of the present invention. The MDI 210 may comprise the interface between the dispensing signals 214 from the storage compartments 16 and the MC 150. For each dispensing signal 214, an optical coupler 211 is used for isolation and a level converter 212 is used to translate the AC signal into a TTL compatible signal level 217. For a typical twenty compartments vending machine, there are twenty identical sections of the interface. The translated TTL dispensing signals 217 can be multiplexed 213 into a binary word 215 with word length sufficient to represent the number of compartments 16. In an exemplary embodiment where there are twenty compartments 16, five bits can be used to uniquely represent a compartment 16 from which a merchandise 20 is dispensed. These binary outputs can be also hardwired-OR together to form an interrupt signal 216 to interrupt the MC 150 when an active signal is detected at any one of the input lines. Upon receiving this interrupt signal, the MC 150 latches the output binary word 215 and appends the compartment number to the transaction record. It will be appreciated that various alternate embodiments of the MDI 210 are within the scope of the present invention.

FIG. 7 depicts a preferred embodiment of the sold out circuit (SOI) 200 formed according to the principles of the present invention. The SOI 200 may comprise the interface between the sold out signals 203 from the storage compartments 16 and the MC 150. For each sold out signal input, an optical coupler 201 is used for isolation and a level converter 202 is used to translate the AC signal 203 into a TTL compatible signal level 204. In the above exemplary embodiment of twenty compartments vending machine, there can be twenty identical sections of the interface. As there may be more than one compartments 16 having an active sold out signal 203 simultaneously, the TTL version of the sold out signals 204 are output to the MC 150 as they are without any multiplexing. As these sold out signals 204 may be active until the sold out compartments 16 are refilled, therefore, the latching of the sold out signals 204 into the MC 150 is not done by interrupt. It will be appreciated that various alternate embodiments of the SOI 200 are within the scope of the present invention.

FIG. 8 depicts a preferred embodiment of the coin detection and simulation interface (CDS) circuit formed according to the principles of the present invention. The CDS may comprise two sub-modules 220, 230. The first sub-module is a coin detection module 220 for detecting any price signal 223 from the coin mech of the vending machine (FIG. 8(*a*)). For the price signal detection module 220, similar optical coupler 221 and level converter 222 combination is used. If one or more price signals 223 are active, then the coin inserted condition is true. Consequently, the coin mech active signal 225 is pulled active. To accommodate this, the price lines are hardwired together at the input. When the output price signal 223 is active, the output price signal 223 interrupts the MC 150. The MC 150 permits the cash operation to complete while the cellular mobile phone dial-in is disabled.

The second sub-module is a coin simulation module 230 for simulating price signals to be sent to the vending machine converter (FIG. 8(*b*)). The simulation module 230 can consist of a plurality of identical sections of switches 231 that derive their identical input 232 from the MC 150. In an exemplary embodiment, four sections of switches 231 are adopted. This input signal 232 from the MC 150 switches the connection between the coin mech price signals 233 to the vending machine controller 234, and a signal of equivalent signal level 235 as the price signals (110 V for example) to the display controller. The purpose of the equivalent signal level is to simulate the price signals. In this case, the switching of all the sections is synchronous, allowing the purchaser to select any merchandise 20 in any of the compartments 16. It will be appreciated that various alternate embodiments of the CDS or its sub-modules 220, 230 are within the scope of the present invention.

The interface of the CCU 100 with the existing vending machine will be described in connection with FIGS. 9 and 10, where the vending machine is of a mechanical type 250 in FIG. 9 and of an electronic type 270, 300 in FIG. 10. In a preferred embodiment as shown in FIG. 9, the input signals to the CCU 100 may include one of more of the following: a group of dispensing signals 267 from the dispensing devices 255, a group of sold out signals 266 from the sold out devices 256, and/or a group of coin mech signals 259 from the coin mech 253. The dispensing signals 267 can be used to identify the storage compartment 257 that has been activated to dispense a merchandise 268. The sold out signals 266 can be used to identify what storage compartment is empty. The coin mech signals 259 can be used to identify what price line has been activated.

It will be appreciated that these input signals may be used for other purposes. In another preferred embodiment, the coin mech signals 259 can be used for vending arbitration. Accordingly, when one of the coin mech signals 259 is active, the wireless purchase function is suspended until the coin operation is completed. Similarly, when a wireless purchase is in progress, the coin mech 253 will be disabled.

The output signals from the CCU 100 to the vending machine 250 can include the simulated signals 258. In a preferred embodiment, the simulated signals 258 are communicated to the display controller 251. The purpose of this group of signals 258 is to simulate purchase signals of similar electrical characteristics as the coin mech signals 259 when a wireless purchase function is activated. In a preferred embodiment of the present invention, the simulated signals 258 are treated as if they were generated from the coin mech 253. Accordingly, the subsequent interpretation of these simulated signals 258 by the display controller 251 can be identical to that of the coin mech signals 259. It will be appreciated that various alternate embodiments of the interface between the CCU 100 and existing mechanical vending machines 250 are within the scope of the present invention.

FIGS. 10(*a*) and 10(*b*) depict preferred embodiments of the interface between the CCU 100 and an electronic type vending machine 270, 300 of the present invention. In FIG. 10(*a*), the interface between the CCU 100 and the electronic type vending machine 270 assumes no knowledge of the electronic unit 273 and works similarly as the interface with the mechanical type vending machine 250 as described above. In FIG. 10(*b*), the interface between the CCU 100 and the electronic type vending machine 300 is carried out through an electronic unit 305, which requires the knowledge of the data protocol used in the electronic unit 305.

In a preferred embodiment as shown in FIG. 10(*b*), there is no direct interface between the dispensing and sold out signals. Instead, an existing communication link 320 of the electronic unit 305 is used. This requires a serial connection between the electronic unit 305 and the CCU 100. Based on this interconnection, the inventory information in the electronic unit 305 may be extracted and returned to the CCU 100 directly. To enable this to occur, the knowledge of the protocol used in communication with the electronic unit 305 and its data format is essential for this interfacing configuration. It will be appreciated that various alternate embodiments of the interface between the CCU 100 and existing electronic vending machines 270, 300 are within the scope of the present invention.

FIG. 11 depicts a preferred embodiment of wireless purchase 350 according to the principles of the present invention. According to this preferred embodiment, the wireless purchase 350 can contain the following simple steps: (1) purchaser dials up a number 354 displayed on the vending machine 351; (2) vending machine 351 receives the call 355 directly; (3) vending machine 351 performs data verification and, if correct, activates the merchandise 20 to be selected; (4) purchaser selects merchandise 20 on the vending machine's display panel 356; and (5) vending machine 351 dispenses 357 the merchandise. It will be appreciated that various alternate embodiments of the wireless purchase 350 are within the scope of the present invention.

In an exemplary embodiment, the purchaser may initiate the purchase by dialing an encoded short code displayed on the vending machine 351, without having to go through the lengthy procedure of sending an SMS. This short code may be in the form of "*xy1234" 354, in which "1234" is a unique identification number of the vending machine 351. The short code is received by the cellular mobile network system 352, where the short code is decoded and mapped to the cellular mobile number of the vending machine concerned. This enables an SMS request 355 to be sent to the vending machine 351.

Upon receipt of the request communicated from the mobile network, the vending machine 351 performs data verification inside the CCU 358 to ensure that the SMS is for purchasing merchandise, rather than other type of SMS messages. If the SMS passes the verification stage, the CCU 358 activates the coin mech signal simulation circuit 230 and enables the purchaser to select merchandise by using the buttons on the display panel of the vending machine 351. At the same time, information regarding the date, time, and the purchaser's phone number can be temporarily stored in the RAM. In addition, a portion of the purchaser's phone number can be displayed on the CCU's display panel.

If a selection is made within a certain time, the transaction is considered complete. The storage compartment from which the merchandise is dispensed is recorded and appended to the current transaction information and marked as a valid vending transaction. Otherwise, the transaction is considered incomplete, in which only the mobile phone number of the purchaser's will be recorded for statistic collection purpose.

FIG. 12 depicts a preferred embodiment of the command and data flow 400 within the vending machine. It will be appreciated, however, that various alternate embodiments of the command and data flow 400 or any portion thereof are within the scope of the present invention.

As shown in FIG. 12, the process begins when the vending machine is power up 401. When the AC power supply of the present invention is switched on, the MC executes its program stored in the EPROM. In a preferred embodiment, the program can initiate the wireless modem 402 and send an SMS message 403 to the central computer. The SMS message 403 can contain the vending machine ID and/or a set of codes to identify the request. The SMS message is capable of notifying the central computer that the transmitting vending machine is coming on-line.

Once the on-line message 403 is dispatched, the vending machine can wait for a return SMS that contains the vending machine's inventory setting 404 from the last power down. If no message is received from the central computer after a predetermined period of time has elapsed 410, the program disables all the wireless purchase and on-line inventory functions 411 and sends a message to the display panel informing the user that the wireless purchase and on-line inventory system is disabled 412. In such disabled mode, the vending machine can still be operated by coins 413, but wireless purchase and on-line inventory functions are disabled. If the inventory setting 404 is received while the vending machine is in its operation mode (i.e., before the predetermined period of time elapses), the program then proceeds to the next stage of wireless purchase and on-line inventory functions 407 as will be described below.

If the inventory setting 404 is received and verified, the program proceeds to enable the wireless purchase 407. The inventory setting 404 received from the central computer may contain an instruction of disabling the wireless purchase function, but enabling the on-line inventory function 406. This instruction allows the central computer to enable or disable the wireless purchase function at a chosen time. If the received setting 404 does not contain such instruction to disable the wireless purchase function, the program proceeds to enable the wireless purchase and on-line inventory functions 408 and sends an appropriate message to the display panel 409. On the other hand, if the received setting 404 contains the instruction to disable the wireless purchase function, the program proceeds to disable the interface with the coin mech signal simulation circuit. The program can also proceed to display 405 a message on the display panel of the vending machine that the wireless purchase function is disabled.

During the disable mode of operation, coin operation 451, 452, 454, 458 and on-line inventory functions 463, 464, 465, 466, 467, 468, 469, 470, 471, 472 are still fully supported. For the coin operation, the program checks 451 the state through the coin mech signal detection circuit. When sufficient coins are received by the coin mech, its output signals are activated to invoke the selection buttons on the display panel of the vending machine 452. When dispensing occurs 454, the transaction is completed. The transaction information is stored 458. The program is capable of differentiating coin insertion 453 from mobile phone dial-in 455. For the coin insertion, the program goes to enable merchandise 452. For mobile phone dial-in, the program sends part of the phone number onto the display 456 and then enables merchandise selection 457. During this phase, if dispensing is detected 459, then the transaction is considered complete and stored 461. Otherwise, a timeout loop will be executed 460. If no dispensing signal is detected when the loop completes, the merchandise selection is deactivated 462. The transaction is thus declared incomplete. Regardless whether the transaction is complete or not, the associated vending transaction information is stored in the memory bank. After the merchandise has been dispensed, the program proceeds to perform the on-line inventory function.

For the on-line inventory function, the program is capable of performing one or more the following tasks in any desired order. First, the program can check the sold out signals through the SOI circuit 464. If a new sold out signal is detected in any of the storage compartments 466, an SMS message is immediately sent 469 to the central computer to raise a warning for servicing. Regardless of the outcome, the program can further check whether it is time to perform a scheduled reporting 472. If so, then all the vending transaction information in the memory is sent to the central computer 470. Otherwise, the program returns to a state waiting for transaction 473 and checks whether the wireless purchase function is enabled.

Second, the program can check the inventory levels 463. If the inventory level of one of the storage compartments is below a pre-set level 465, then an SMS message is sent 469 to the central computer immediately to raise a warning for servicing. Regardless of the outcome, the program can further check whether it is time to perform a scheduled reporting 472. If so, then all the vending transaction information in the memory is sent to the central computer 470. Otherwise, the program returns to a state waiting for transaction 473 and checks whether the wireless purchase function is enabled.

Third, the program can record the value of the quantity counter 468 and the state of the door switch and refill/service switch 471. After that, the program can check whether it is time to perform a scheduled reporting 472. If so, then all the vending transaction information in the memory is sent to the central computer 470. Otherwise, the program returns to a state waiting for transaction 473 and checks whether the wireless purchase function is enabled.

Fourth, the program can check whether the power supply level is below a certain preset level 467. This may happen when power supply is unstable or experiencing a transient, or when the vending machine is being power down. To avoid the problem of unstable power supply or transient, a predetermined period of time is incorporated in the detection. If the duration of the drop in supply level is short, then the program ignores the occurrence. Because the system contains a backup battery, a supply drop over a short period of time does not affect the operation of the present invention. However, if the drop in power level exceeds the predetermined period of time, a power down condition is confirmed. Once a power down condition is confirmed, all the vending transaction information and an identification message are immediately dispatched to the central computer 474. After the messages are sent, the MC switches itself to a sleeping mode, which can be switched on when the normal power supply resumes 475. When the vending machine is power up again, the program starts the power up sequence as described above.

FIG. 13 depicts a preferred embodiment of the configuration of the on-line inventory management approach 370 formed according to the principles of the present invention. In the preferred embodiment, the on-line inventory management approach 370 can consist of a plurality of vending machines 371 and a central control computer 374. The vending machines 371 can be either a mechanical or an electronic type as described above and can be on-lined via the CCU wireless communication channel 382 and the commercial cellular mobile network 372. Each vending machine 371 can be uniquely identified by a mobile phone number known only to the central computer 374, while wireless purchase is invoked by dialing a short code unique to each vending machine 371. The central computer 374 can be connected to the mobile network via a fixed line 384, 373, 383, or a wireless modem. The central computer 374 can be also networked 378, 379, 380, 381 with the vending operator's server 376, inventory database 375, and on-line reporting procedures 377. It will be appreciated that various alternate embodiments of the on-line inventory management approach 370 are within the scope of the present invention.

In an exemplary embodiment of the present invention, the central computer 374 can execute a program that performs one or more of the following tasks: being responsible for all the communications with all the vending machines, updating the server's inventory database when the vending transaction information is available, performing local house-keeping such as keeping a data and event log for all the information received, initializing, and maintaining the communication link with the vending machines and the operator's server and inventory database, supporting visualization of inventory data and individual vending machine status, and producing inventory data in a pre-defined report format for management purposes.

There are various types of communication between the vending machine 371 and the central computer 374. One type of communication is the system on-line reporting, which is sent when the vending machine 371 is power up. The message informs the central computer 374 that the vending machine 371 is on-line. Upon receiving this message, the central computer 374 returns the last inventory data to the vending machine 371, so that the vending machine 371 can begin its wireless purchase and on-line inventory functions. An alternative type of communication is the on-line scheduled reporting communication. This communication is pre-set to a time of a day, at which time the CCU packs all the vending transaction information into SMS message(s) and sends them back to the central computer 374. Upon receiving the message(s), the central computer 374 updates the database, which in turn generates inventory reports. Another type of communication is the large content reporting, which is invoked at any time when the number of vending transaction information has exceeded a pre-defined threshold. This occurs when there is a sudden surge in the number of transactions.

A further type of communication is the alert reporting, which occurs when a new sold out signal or low inventory level is detected in any of the storage compartment. Upon detecting this condition, the CCU immediately sends an alert message back to the central computer 374. The central computer 374 records the condition and flags it in the visualization. A still further type of communication is the power down reporting, which is similar to the other reporting of vending transaction information, except that there is an additional message attached to identify that the vending machine 371 will go off-line in a short while. One additional type of communication is the audit request initiated by the central computer 374. This allows the central computer 374 to request inventory data and transaction information from the vending machine 371 at any time. Upon receiving this request, the vending machine 371 returns its vending transaction information to the central computer 374. It will be appreciated that various alternate embodiments of the communication between the vending machine 371 and the central computer 374 are within the scope of the present invention.

FIG. 14 depicts a preferred embodiment of the command and data flow 500 of the on-line inventory management formed according to the principles of the present invention.

It will be appreciated, however, that various alternate embodiments of the command and data flow 500 or any portion thereof are within the scope of the present invention. The approach begins 501 with an initialization of the wireless modem or a fixed data line 504. Once the communication is set up, the central computer polls to see whether an SMS message has been received 505. If this condition is true, then central computer checks to see what type of communication it is. There can be various types of SMS messages to which the program will act accordingly as described as follows.

For an on-line message, the program proceeds to retrieve the setting of the originating vending machine from the database 512 and returns the setting to the originating vending machine immediately 513. The event is then logged in a local log file 517. The status of the originating vending machine is updated in the visualization 516.

For a scheduled report message, the program proceeds to update inventory and transaction information in the database 511 and returns an acknowledgment to the originating vending machine 514. The event is also logged in a local log file 517.

For a large content report message, the program proceeds to update the inventory and transaction information in the database 511 and returns an acknowledgment to the originating vending machine 514. The event is also logged in a local log file 517.

For a power down message, the program proceeds to update the inventory and transaction information in the database 511 and returns an acknowledgment to the originating vending machine 514. The event is then logged in a local log file 517; the status of the message sending vending machine is updated in the visualization 516.

For an alert message, the program proceeds to update the inventory and transaction information in the database 511. The program further updates the status of the originating vending machine on the visualization 516 and/or enters the event into a warning report 515.

If an audit request message 506 is issued, the program sends a request message to the target vending machine 507 and waits for its reply, with time out 509. Upon receiving the vending transaction information 508 from the target vending machine, the program updates the database and returns an acknowledgment 510. The event is then logged in a local log file 517. If the request is time-out, the program flags this condition on the visualization and enters the event into a warning report 515. If no audit request is issued, the program checks whether it is time for a scheduled database update 503. If so, the program can further update the database 502. Otherwise, the program can return to wait for SMS message 505.

It will be appreciated that the various features described herein may be used singly or in any combination thereof. Thus, the present invention is not limited to only the embodiments specifically described herein. While the foregoing description and drawings represent a preferred embodiment of the present invention, it will be understood that various additions, modifications, and substitutions may be made therein without departing from the spirit and scope of the present invention as defined in the accompanying claims. In particular, it will be clear to those skilled in the art that the present invention may be embodied in other specific forms, structures, and arrangements, and with other elements, and components, without departing from the spirit or essential characteristics thereof. One skilled in the art will appreciate that the invention may be used with many modifications of structure, arrangement, and components and otherwise, used in the practice of the invention, which are particularly adapted to specific environments and operative requirements without departing from the principles of the present invention. The presently disclosed embodiment is therefore to be considered in all respects as illustrative and not restrictive, the scope of the invention being indicated by the appended claims, and not limited to the foregoing description.

What is claimed is:

1. A system for conducting on-line inventory information acquisition and storage and automatic communication with a central computer for a plurality of vending machines, the system comprising:

providing a machine power up procedure in response to the switching on of an AC power supply to the vending machine, whereby the vending machine enters a normal operating mode and reports its identity to the central computer via the wireless modem and whereby, upon receiving the identity of the vending machine, the central computer searches in its database for the vending machine's last system status, returns the status information to the vending machine, and records the on-line status of the vending machine in the central computer's database; the system status comprising the vending machine selection button-to storage compartment mapping information; the storage compartment information comprising flavor, capacity, inventory and price, compartment margin, flavor margin, total margin, quantity counter value and periodic time elapsed;

providing a machine power down procedure in response to the switching off of the AC power supply to the vending machine, whereby the vending machine transmits to the central computer the system status and transaction information since the last reporting and enters into a sleep mode when the central computer receives and acknowledges the information, and whereby, upon receiving the power off status of the vending machine, the central computer updates the vending machine's entry in the central computer's database;

receiving vending transaction information from a plurality of vending machines initiated by the vending machines at a time determined by a control and communication unit predefined by the central computer;

receiving vending transaction information from a plurality of vending machines via the cellular mobile telephone network using a short message service format or a standard data transfer format;

a short message service means for representing the information by a data packet and sending the packet to the cellular mobile telephone network, which buffers the packet and forwards it to a receiver;

providing an identification code for the vending machine for wireless purchase and communication with the central computer;

updating transaction information in the database of the central computer;

exporting the updated transaction information in the central computer to other computer systems;

compiling the updated transaction information in the central computer in a pre-defined report format;

wherein the central computer comprises:

a fixed telephone line or a cellular mobile phone coupled with a wired or wireless modem for communication; and a software package means for supporting visualization to the operator of the system, for communicating via the cellular mobile phone network with a plurality of vending machines, for managing database by collating the data for data analysis, route planning, inventory control, and other management purposes.

2. A system for purchasing merchandise from a vending machine through a cellular telephone, the system comprising:

a control and communication unit means for performing inventory data acquisition, directly controlling vending events, determining alert status, storing vending transaction information, and communicating alert message and vending transaction information to a central computer; the control and communication unit means comprising a micro-controller;

an inventory data acquisition means for collecting the inventory data electronically, the inventory data comprising the number and type of merchandise in each storage compartment and the capacity of each storage compartment for the plurality of storage compartments for storing merchandise to be vended;

a vending event means for at least one vending machine adapted to selectively dispense from a preloaded merchandise inventory at a predetermined price of a predetermined currency, to a purchaser upon payment of the price of the currency in either cash or electronically charged to a stored value card, credit card or cellular mobile phone account;

a vending event controlling means for detecting coin mechanism signals and disabling other purchase co-exit mechanism if payment is through a coin mechanism, for simulating coin mechanism signals to initiate a vending event if the purchaser initiates a purchase by keying in a sequence of predefined code on a cellular mobile phone and electronically charge the cellular mobile phone account, and for simulating coin mechanism signals to initiate a vending event if the purchaser initiates a purchase by electronically charging the payment to a stored value card or credit card;

a vending transaction means for representing a vending event;

a vending transaction information comprising, for a plurality of storage compartments and for a plurality of vending transactions, data representing every transaction date, time, compartment from which the merchandise is dispensed, quantity counter value, and payment type and account, wherein if the payment is in cash, the payment has a null entry; if the payment is by a cellular mobile phone, the payment account is the phone number, and if the payment is a stored value card or credit card, the payment account is the account of the stored value card or credit card;

a data and time means for representing the timing representative of the date and time of the vending events;

a transaction information storage means for storing the transaction information in a memory storage device in the micro-controller;

a transaction information communication means for transmitting the transaction information in an encoded form with error checking through a wireless modem over the cellular mobile telephone network to a central computer;

an alert information means for a plurality of storage compartments for composing an alert message if the inventory in these compartments fall below one of the compartment margin, flavor margin, or the total margin;

an alert information communication means for transmitting the alert message in an encoded form with error checking through a wireless modem over the cellular mobile telephone network to the central computer;

a wireless modem means for communicating with the purchaser if the purchaser initiates a purchase by keying in a sequence of predefined code on a cellular mobile phone, for communicating with the, central computer if micro-controller detects that a predefined period of time has elapsed, or detects a sold out signal, or the activation of a service signal, or a battery low signal, or an AC power being switched on or off, or an error condition, and for communicating with the central computer if the central computer initiates an inquiry; the predefined code comprising an agreed sequence of numbers that uniquely identifies the wireless purchase and the vending machine of which the purchase is to be performed; the predefined period of time means a period of time defined between two consecutive automatic communication of information or data with the central computer;

a power management circuit means for detecting and switching on and off of the AC power supply and providing an alternative power supply if the AC power supply is switched off, for charging a backup battery when the AC power supply is switched on, and for providing power supply to the micro-controller and its peripherals for a period of time until the vending transaction information has been communicated to the central computer;

a display panel means for displaying a number of digits of the cellular mobile phone number during purchasing by the cellular mobile phone, and for displaying the charge of the vending transaction if it is by credit card or stored value card, for displaying the status of the apparatus when being services, and for displaying relevant information or error messages representative of the status of the apparatus;

a quantity counter means for a mechanical number counter of the vending machine providing a total count of the sales since the vending machine is first installed;

a service switch means for providing one or more electronic pulses to specify whether it is a refill service or a refill plus flavor change service;

a sold out interface means for detecting the presence of sold out signals from a plurality of storage compartments, for converting the sold out signals into signal levels electrically compatible with the micro-controller signal levels, and for identifying from which storage compartments the sold out signals are generated;

a merchandise dispensing interface means for detecting the presence of the dispensing signal from a storage compartment, for converting the dispensing signal into a signal level electrically compatible with the micro-controller signal level, and for identifying from which storage compartment the dispensing signal is generated;

a merchandise selection interface means for detecting the signal representing the storage compartment that the purchaser has selected on the display panel of the vending machine, for converting the selection signal into a signal level electrically compatible with the micro-controller signal level, and for identifying from which storage compartment the purchaser has selected;

a coin mechanism signal detection means for detecting the presence of the signals output from the coin mechanism, for converting the coin mechanism output signals into signal levels electrically compatible with the micro-controller signal levels, and for arbitrating the coin mechanism output signals from the coin mechanism and signals from other purchasing devices to ensure a contention-free operation; and a coin mechanism simulation means for converting purchasing signals from cellular mobile phones, credit cards, or stored value cards into electrically simulated coin mechanism signals as if they are generated from the coin mechanism.

3. The system of claim 2 wherein the micro-controller further comprising:

a central processing unit means for performing arithmetic and logic operations to handle cellular mobile communication, service interrupts from the interfacing circuits, display information on the display panel means, assemble vending transaction information, create data record from transaction information, write the data record into memory, encode and error check the alert message before sending it through the wireless modem;

a memory unit means for storing data records corresponding to the vending transaction information, machine setting, and alert message;

a peripheral interface unit means for interfacing with the display panel means, the quantity counter means, the service switch means, the backup battery and power management circuit means, the sold out signals, the merchandise dispensing signals, the merchandise display and selection signals, the coin mechanism signal detection means, and the coin mechanism signal simulation means;

a real-time clock means for providing date and time information;

a watch-dog circuit means for providing a soft reset to the micro-controller when certain predefined conditions are met; and a serial interface means for supporting the wireless modem.

4. The system of claim 3 wherein the service switch means comprises a mechanical switch and an electronic interface with the peripheral interface unit means of the micro-controller for providing a single pulse or double pulse timing waveform to the micro-controller, representing refill service or refill and flavor change, respectively.

5. The system of claim 2 wherein the quantity counter means comprises an electronic interface to the mechanical number counter for comparing electronically detected inventory information of a plurality of storage compartments with inventory information obtained by the mechanical number counter.

6. The system of claim 2 wherein the coin mechanism signal detection means and coin mechanism simulation means comprises:

a signal level conversion circuit means for converting the signal level of the coin mechanism output signals into levels compatible with the micro-controller and converting the simulated signal level of the micro-controller into levels compatible with the coin mechanism;

a signal detection circuit means for detecting the levels of the converted signal;

an arbitration circuit means for arbitrating between the signals from different input devices; and a signal simulation circuit means for simulating the coin mechanism signal by the micro-controller as if payment is made through the coin mechanism.

7. The system of claim 2 wherein the sold out interface means comprises:
- a signal level conversion circuit means for converting the signal level of a sold out device into levels compatible with the micro-controller; and
- a signal detection circuit means for detecting the level of the converted sold out signal.

8. The system of claim 2 wherein the merchandise dispensing interface means comprises:
- a signal level conversion circuit means for converting the signal level of a dispensing device into levels compatible with the micro-controller; and
- a signal detection circuit means for detecting the level of the converted dispensing signal.

9. The system of claim 2 wherein the display panel means and the merchandise selection interface means comprise:
- a signal level conversion circuit means for converting the signal level of a display and selection device into levels compatible with the micro-controller; and
- a signal detection circuit means for detecting the level of the converted display and selection signal.

10. The system of claim 2 wherein the power management circuit means comprises:
- a power level detection circuit means for detecting a drop in power supply from an output of an AC transformer and for supplying power to the micro-controller and other circuits when the power supply is below a certain level; and
- a battery charging circuit means for charging the backup battery when the AC power is present.

11. The system of claim 2 wherein the format of information further comprises:
- a setting representing message identification, button-compartment mapping, number of compartments, compartment information, safety margin, last counter reading, scheduled audit time, and error checking;
- an acknowledgment/advance control representing message identification, message type, change safety margin, change audit time, change flavor, and error checking;
- an online means representing message identification and error checking;
- an offline means representing message identification, vending transaction information, inventory report, and error checking;
- a short audit means representing message identification, time stamp, alert level, inventory report, and error checking;
- vending transaction information representing time stamp, number of records, records and counter reading; and
- an inventory report representing number of compartments and inventory.

* * * * *